US010858938B2

United States Patent
Bowen

(10) Patent No.: US 10,858,938 B2
(45) Date of Patent: Dec. 8, 2020

(54) PISTON ARRANGEMENT

(71) Applicant: Newlenoir Limited, London (GB)

(72) Inventor: Ryan Bowen, London (GB)

(73) Assignee: Newlenoir Limited, London (GB)

( * ) Notice: Subject to any disclaimer, the term of this patent is extended or adjusted under 35 U.S.C. 154(b) by 0 days.

(21) Appl. No.: 16/457,457

(22) Filed: Jun. 28, 2019

(65) Prior Publication Data

US 2019/0323009 A1   Oct. 24, 2019

Related U.S. Application Data

(63) Continuation of application No. 15/112,148, filed as application No. PCT/GB2015/050050 on Jan. 13, 2015, now Pat. No. 10,472,964.

(30) Foreign Application Priority Data

Jan. 15, 2014   (GB) .................................. 1400682.9

(51) Int. Cl.
  *F01B 9/06*    (2006.01)
  *F16M 1/02*    (2006.01)
  (Continued)

(52) U.S. Cl.
  CPC ............... *F01B 9/06* (2013.01); *F01M 9/101* (2013.01); *F02B 75/40* (2013.01); *F16M 1/02* (2013.01); *F01B 2009/061* (2013.01)

(58) Field of Classification Search
  CPC ........ F01B 9/06; F01B 2009/061; F01B 3/04; F16M 1/02; F01M 9/101; F02B 75/40;
  (Continued)

(56) References Cited

U.S. PATENT DOCUMENTS

| | | | |
|---|---|---|---|
| 349,775 A | 9/1886 | Wood | |
| 1,374,164 A | 4/1921 | Nordwick | |

(Continued)

FOREIGN PATENT DOCUMENTS

| | | |
|---|---|---|
| CA | 2770273 A1 | 8/2013 |
| DE | 3832141 A1 | 3/1990 |

(Continued)

OTHER PUBLICATIONS

Aug. 28, 2019, Examination Report No. 2 from IP Australia in Australian Patent Application No. 2018200606, which is a co-pending application of applicant Newlenoir Limited.

(Continued)

*Primary Examiner* — Audrey K Bradley
*Assistant Examiner* — Edward Bushard
(74) *Attorney, Agent, or Firm* — Kolitch Romano LLC

(57) ABSTRACT

A piston arrangement is provided. The piston assembly includes a track and a piston moveable within a cylinder. The track is rotatable relative to the cylinder about an axis of rotation and has a cam surface and an edge surface extending away from the cam surface. The piston is coupled to the track by a follower running on the cam surface. The cam surface is shaped such that, as the track moves relative to the cylinder, the piston head moves in reciprocating motion within the cylinder along a piston axis in accordance with the path of the cam surface. The piston axis is perpendicular to the track axis of rotation. A stabilizing element is connected to the piston, the stabilizing element extending below the piston head and comprising a contact surface which engages the edge surface of the track.

16 Claims, 26 Drawing Sheets

(51) Int. Cl.
F01M 9/10 (2006.01)
F02B 75/40 (2006.01)

(58) Field of Classification Search
CPC ........ F02M 59/102; F04B 1/0531; F16J 1/10; F16J 1/20
See application file for complete search history.

(56) References Cited

U.S. PATENT DOCUMENTS

| | | | |
|---|---|---|---|
| 1,607,505 | A | 11/1926 | Bentley |
| 1,792,062 | A | 2/1931 | Barnum |
| 2,120,657 | A | 1/1937 | Tucker |
| 2,392,211 | A | 1/1946 | Zorich |
| 2,407,859 | A | 9/1946 | Wilson |
| 2,416,045 | A | 2/1947 | Chapman |
| 3,118,432 | A | 1/1964 | Peterson |
| 3,396,709 | A | 8/1968 | Robicheaux |
| 3,403,508 | A | 10/1968 | Kelly |
| 3,572,209 | A | 3/1971 | Aldridge et al. |
| 5,209,190 | A | 5/1993 | Paul |
| 5,315,967 | A | 5/1994 | Schoell |
| 5,454,352 | A | 10/1995 | Ward |
| 5,537,971 | A | 7/1996 | Pong |
| 6,691,648 | B2 | 2/2004 | Beierle |
| 6,928,965 | B2 | 8/2005 | Teufl |
| 7,475,627 | B2 | 1/2009 | Irick et al. |
| 2001/0017122 | A1 | 8/2001 | Fantuzzi |
| 2002/0007814 | A1 | 1/2002 | Mansur |
| 2003/0051681 | A1 | 3/2003 | Harcourt |
| 2005/0172918 | A1 | 8/2005 | Humphries |
| 2008/0295807 | A1 | 12/2008 | Bauer et al. |
| 2009/0056658 | A1 | 3/2009 | Naito |
| 2010/0154749 | A1 | 6/2010 | Barberato |
| 2014/0165825 | A1 | 6/2014 | Tibari |
| 2015/0013420 | A1 | 1/2015 | Shibutani |
| 2015/0114148 | A1 | 4/2015 | Van Den Brink |

FOREIGN PATENT DOCUMENTS

| | | |
|---|---|---|
| DE | 4030730 A1 | 4/1992 |
| DE | 102009001118 A1 | 8/2010 |
| EP | 0561933 A1 | 9/1993 |
| EP | 1413749 A2 | 4/2004 |
| FR | 2307132 A1 | 11/1976 |
| FR | 2767559 A1 | 2/1999 |
| JP | H08-4550 A | 1/1996 |
| JP | H08004550 | 1/1996 |
| JP | 2006104996 A | 4/2006 |
| JP | 2006112408 A1 | 4/2006 |
| JP | 2008025491 A | 2/2008 |
| JP | 2008522077 A | 6/2008 |
| WO | 03046337 A1 | 6/2003 |
| WO | 03093662 A1 | 11/2003 |
| WO | 2005040558 A1 | 5/2005 |
| WO | 2007019452 A2 | 2/2007 |
| WO | 2012168696 A2 | 12/2012 |
| WO | 2012168696 A3 | 12/2012 |
| WO | 2013082652 A1 | 6/2013 |
| WO | 2013095112 A1 | 6/2013 |
| WO | 2014107628 A1 | 7/2014 |

OTHER PUBLICATIONS

Japanese Office Action Patent Application No. 2018-241518; dated Feb. 2, 2020.
Chinese Office Action Patent Application No. 201810913080.8; dated Apr. 7, 2020.
Jan. 21, 2020 Communication Pursuant to Article 94(3) EPC from the European Patent Office in European Patent Application Serial No. 18209667.7, which is a co-pending application of Applicant Newlenoir Limited.
European Patent Office, Extended European Search Report pursuant to Rule 62 EPC, dated May 28, 2020 in Patent Application No. 120156488.7, which is a foreign counterpart to this U.S. Application.
European Patent Office, "Summons to attend oral proceedings pursuant to Rule 115(1) EPC", official communication, dated Sep. 25, 2020.

PISTON ARRANGEMENT

FIELD

This disclosure relates to piston arrangements, in particular power transfer mechanisms coupling a piston head to a track which controls movement of the piston head.

INTRODUCTION

A conventional piston arrangement used, for example, in internal combustion engines comprises a piston head moveable within a cylinder coupled to a crankshaft by a con-rod. In an alternative piston arrangement, a piston head may be coupled to a track having a cam surface, the piston head being provided with one or more cam followers which run along the track to control movement of the piston head. The present invention relates to improvements in the power transfer mechanism coupling a piston head to a track in such an alternative piston arrangement.

SUMMARY

A first aspect of the invention provides a piston arrangement including a track and a piston moveable within a cylinder; wherein the track is adapted to rotate relative to the cylinder about an axis of rotation and has a cam surface and an edge surface extending away from the cam surface; wherein the piston is coupled to the track by a follower running on the cam surface; wherein the cam surface is shaped such that, as the track moves relative to the cylinder, the piston head moves in reciprocating motion within the cylinder in accordance with the path of the cam surface; wherein a stabilizing element is connected to the piston, the stabilizing element extending below the piston head and comprising a contact surface which engages the edge surface of the track. The stabilizing element acts to stabilize the piston a direction perpendicular to the plane of the edge surface of the track.

The track may rotate about the axis of rotation while the cylinder remains stationary with respect to the axis of rotation. Alternatively, the cylinder may move along a fixed track. The track may comprise a single track portion or alternatively at least two track portions on opposite sides of the stabilizing portion. The or each track portion may provide a cam surface on which a single follower runs or alternatively two opposing cam surfaces on which first and second followers run. Various different possible track arrangements will be discussed in greater detail below.

The track may form a continuous loop and the cam surface may form a continuous surface extending around the loop. Alternatively, there may be a break in the cam surface, for example a small discontinuity. The cam surface may be fixed with respect to the track, or alternatively the cam surface may include a fixed portion which is fixed with respect to the track and a moving portion which forms part of the cam surface and which is moveable with respect to the track, for example one or more rollers mounted to the track. The roller may be adapted to rotate about an axis of rotation, and may rotate freely, be partially constrained and/or be driven.

The stabilizing element may be rigidly attached to the piston head, for example by fasteners. Alternatively, the stabilizing element may be otherwise rigidly or pivotally attached to the piston head or may be integrally formed with the piston head. The stabilizing element may be connected to the piston head via an intermediate component such as a con-rod, which may be rigidly attached to the piston head and to the stabilizing element or alternatively pivotally attached to the piston head and to the stabilizing element.

The stabilizing portion may be blade-like such that it has a thickness in a direction perpendicular to the plane of the edge surface of the track which is significantly smaller than its length in a direction parallel to the plane of the edge surface and perpendicular to the direction of movement of the piston. For example, the length of the stabilizing element may be at least twice the thickness of the stabilizing element, or at least three times the thickness, or at least four times the thickness, or at least five times the thickness. The length of the stabilizing element may be substantially equal to the diameter of the piston head, or alternatively may be greater or smaller than the piston head diameter.

The shape of the contact surface of the stabilizing element may substantially correspond to the shape of the edge surface of the track. For example, the edge surface of the track may be straight and the contact surface of the stabilizing element may have a corresponding straight shape, or alternatively the edge surface of the track may be convex and the contact surface of the stabilizing element may have a corresponding concave shape. Alternatively, the contact surface of the stabilizing element may have some other shape, for example a convex stabilizing element may bear against a straight or convex edge surface of the track.

The stabilizing element may comprise first and second end surfaces, the contact surface extending between the first and second end surfaces, wherein at least one of the first and second end surfaces slidingly engages a locating element as the piston moves in reciprocating motion. Preferably the first and second end surfaces of the stabilizing element slidingly engage first and second locating elements, thereby stabilizing the piston in a direction perpendicular to the plane of the edge surface(s) of the track. The interface between the end surfaces and the locating elements is preferably planar but may have some other shape.

The follower may comprise a roller mounted to the piston, the roller being adapted to rotate relative to the piston as it runs along the track. The roller may be mounted in or on the piston head and/or in or on the stabilizing element. The piston arrangement may, for example, comprise a bearing according to the second aspect of the invention (discussed below). Alternatively, the follower may be a be a roller mounted on a full cylindrical shaft which protrudes from the piston head and/or stabilizing element. Alternatively, the follower may be a roller extending through or into the piston head and/or stabilizing element which only engages the piston head and/or stabilizing element via a full cylindrical contact patch extending around the circumference of the roller. There may be multiple rollers or other followers mounted to the piston, for example multiple followers running on multiple cam surfaces of the track.

The track may comprise first and second cam surfaces facing away from each other in opposite directions, the edge surface extending between the first and second cam surfaces; wherein the piston comprises first and second followers respectively running on the first and second cam surfaces. The first and second followers are preferably offset from each other is a direction parallel to the piston axis. The stabilizing element preferably extends between and connects the first and second followers. The first follower may be arranged to move the piston in a first direction aligned with its axis and the second follower may be arranged to move the piston in a second direction opposing the first direction. The opposing first and second cam surfaces may oppose each other by facing outwardly away from each other or alternatively by facing inwardly towards each other.

The track may comprise first and second track portions located on opposite sides of the stabilizing element, wherein the first track portion comprises an edge surface extending away from at least one cam surface and the second track portion comprises an edge surface extending away from at least one cam surface and facing towards the edge surface of the first track portion, wherein the stabilizing element comprises first and second contact surfaces which engage the respective edge surfaces of the first and second track portions. The piston may therefore be fully stabilized in a direction perpendicular to the plane of the edge surfaces of the track.

The stabilizing portion may have a substantially uniform thickness along its length. The stabilizing element may have a thickness which tapers across the extent of the stabilizing element in a direction parallel to the direction of relative movement between the piston and the track. The taper may allow the stabilizing portion to be self centering within a gap formed between the edge surfaces of the first and second track portions, for example under hydro-static pressure. The taper may be small compared to the overall thickness of the stabilizing element, for example a clearance of 0.08 mm may be provided between the contact surfaces of the stabilizing element and the edge surfaces of the respective track portions at one end of the stabilizing portion compared to a clearance of 0.04 mm at the opposing end. Different clearances and taper angles may be employed depending on the application of the piston arrangement. The stabilizing element may alternatively have any other shape, for example a convex shape bearing against a straight or convex edge surface.

The track may be a radial track with the cam surface(s) arranged as inner radial and/or outer radial surfaces with respect to the axis of rotation. The track may therefore have a height in a direction extending radially outwardly from the axis of rotation which varies along the extent of the track. The edge surface of the first track portion may be substantially parallel to the edge surface of the second track portion. The stabilizing element may be substantially straight when viewed from a direction parallel to the axis of the piston.

The track may be an annular track with the cam surface(s) arranged facing in a direction parallel to the axis of rotation. The track may therefore have a height in a direction parallel to the axis of rotation which varies along the extent of the track. The first and second track portions may be arranged concentrically such that an annular gap is formed between the edge surfaces of the first and second track portions. The edge surfaces of the first and second track portions may therefore respectively comprise an outer radial face of an inner track portion and an inner radial face of an outer track portion. The stabilizing element may be located within the annular gap and have a curved shape when viewed from a direction parallel to the axis of rotation, the curved shape having a radius substantially corresponding to that of the annular gap. The stabilizing element may have a first contact surface which engages the outer radial surface of the inner track portion and has a radius of curvature substantially corresponding to the radius of curvature of the outer radial surface of the inner track portion, and a second contact surface which engages the inner radial surface of the outer track portion and has a radius of curvature substantially corresponding to the radius of curvature of the inner radial surface of the outer track portion.

The edge surface may be lubricated such that the contact surface of the stabilizing element contacts the edge surface of the track via a layer of lubricant. Where the track comprises first and second track portions, the edge surfaces of both track portions may be lubricated.

The contact surface of the stabilizing element may comprise a lubricant pick-up adapted to receive lubricant from the edge surface of the track. Lubricant may therefore be taken up by the stabilizing element via the lubricant pick-up and supplied around the stabilizing element and around the piston to any parts of the stabilizing element or piston which require lubrication. The pick-up may comprise a hole formed in the contact surface. There may be one or more pick-ups located on one or both contact surfaces of the stabilizing element.

The edge surface may be lubricated by a lubricant delivery device; wherein the lubricant delivery device comprises a body portion including a lubricant delivery port through which lubricant is supplied to the edge surface; wherein the lubricant delivery device further comprises at least one follower which couples the lubricant delivery device to the track such that, as the track moves relative to the cylinder, the lubricant delivery device moves in reciprocating motion in accordance with the path of the track thereby maintaining the lubricant supply to the edge surface. The lubricant delivery device preferably comprises first and second followers running on first and second cam surfaces of the track which respectively act to move the lubricant delivery device in opposing directions. In some embodiments, one or both followers may be adapted to sweep excess oil away from one or more cam surfaces of the track on which the piston mounted followers run, although the lubricant delivery device followers are not required to have any lubricant clearing function. The lubricant delivery device followers preferably have the same spacing and radii as the first and second followers mounted to the piston. The lubricant delivery device followers are preferably integrally formed with the body portion of the lubrication device and have sliding bearing surfaces which run on the cam surfaces of the track, but alternatively may comprise bearings or rollers. Alternatively, the edge surface(s) may be lubricated in by alternative means, for example lubricant jets.

An internal combustion engine may comprise at least one piston arrangement according to the first aspect of the invention. Alternatively, the piston arrangement may be used in another application, for example in a pump. The internal combustion engine may comprise multiple piston arrangements running from a common track and/or multiple tracks driving separate piston arrangements.

A second aspect of the invention provides a piston arrangement including a piston moveable within a cylinder and a track having a cam surface which is adapted to move relative to the cylinder; wherein the piston is coupled to the track by a bearing which runs on the cam surface; wherein the bearing has a roller and a curved bearing surface on which the roller is rotatably mounted such that the roller is held captive between the cam surface and the bearing surface; wherein the bearing surface engages the roller via a contact patch which extends only a portion of the distance around the circumference of the roller. A piston arrangement according to the second aspect of the invention may include at least some of the features described in relation to the first aspect of the invention.

The bearing transfers loads between the piston and the track via the roller. The roller is adapted to rotate on the curved bearing surface and roll along the track, although the roller may also experience slip relative to the track. Because the bearing does not have a full 360 degree contact patch between bearing surface and the roller, the bearing advantageously reduces or prevents bearing whirl.

The curved bearing surface may engage an inner radial surface of the roller.

The curved bearing surface may be provided on a shoe which extends into a hollow center of the roller. The shoe may be integrally formed with the piston. Alternatively, the shoe may be otherwise attached to the piston, for example by fasteners or by a welded joint. There may be one or more intervening components via which the shoe is connected to the piston head. The roller may be held captive between the shoe and the running surface such that it can rotate on the shoe but cannot leave the shoe unless the shoe and the track are moved apart from each other. The shoe may comprise a single one-piece shoe, or alternatively the shoe may comprise multiple discrete shoe sections.

The shoe may comprise a lubricant outlet and/or a lubricant pick-up for supplying a lubricant to the inner radial surface of the roller and/or removing lubricant from the inner radial surface of the roller. The shoe may therefore lubricate the interface between the curved bearing surface and the roller, and the lubricant may be continuously replaced, for example to control the temperature of the lubricant on the inner radial surface of the roller. Preferably the lubricant outlet and/or lubricant pick-up are provided on the curved bearing surface.

The roller may have a radially inwardly extending flange located to the side of the shoe. The flange may comprise first and second radially inwardly extending flanges on alternate sides of the shoe. The flange(s) may help to retain the roller on the shoe.

The contact patch between the curved bearing surface and the inner radial surface of the roller may extends through an angle of less than 180 degrees. Preferably the contact patch extends through an angle of less than 160 degrees or less than 140 degrees or less than 120 degrees or less than 100 degrees or less than 90 degrees. Alternatively, the contact patch may extend through an angle greater than 180 degrees, for example 200 degrees or more. Particularly where the roller comprises one or more radially inwardly extending flanges, a contact patch which extends through less than 180 degrees may improve ease of installation of the roller on the shoe.

The contact patch between the curved bearing surface and the inner radial surface of the roller may be offset to one side of a plane passing through the central axis of rotation of the roller and aligned with the direction of movement of the piston within the cylinder. For example, at least 55% or at least 60% or at least 70% or at least 80% of the contact patch by area may be located to one side of the plane. A central point of the contact patch may be offset to one side of the plane, for example by at least 5 degrees or at least 10 degrees or at least 20 degrees or at least 30 degrees around the central axis of rotation of the roller. The shoe may be offset to one side of the plane. The contact patch and the shoe may be aligned with or offset towards a direction of peak loading. Offsetting the shoe towards one side of the roller may help to withstand peak loads which are transmitted between the track and the piston via the roller at an angle which is not aligned with the direction of movement of the component.

The curved bearing surface may engage an outer radial surface of the roller. Because the bearing surface does not extend around the entire circumference of the roller, a portion of the outer surface of the roller remains exposed, that is the portion of the circumference of the roller around which the curved bearing surface does not extend. Therefore, the roller can run on the cam surface while also engaging the curved bearing surface at a location directly above its interface with the cam surface. Load transfer between the track and the piston via the roller is therefore improved.

It should be noted that although the curved bearing surface engages the roller via a contact patch which extends only a portion of the distance around the circumference of the roller, thereby allowing an exposed portion of the roller to engage the cam surface, the roller may also engage a further bearing surface which extends around a greater portion of the circumference, for example up to 360 degrees. In this case the further bearing surface is located to the side of the roller at a location where it is not required to leave a portion of the outer radial surface of the roller exposed so that it can engage the track. The further bearing surface may be continuous with the bearing surface referred to above. For example, if the roller extends through the piston to engage cam surfaces on alternate sides of the piston (as described in more detail below), the roller may engage cam surfaces on alternate sides of the piston via contact patches which leave a portion of the radial outer surface exposed and also via an intermediate bearing surface which may extend around the entire circumference of the roller.

The piston may have a head with a working face; wherein the curved bearing surface is provided on a reverse side of the piston head. The piston head may be at least partially hollow or alternatively solid. Alternatively, the curved bearing surface engaging the outer radial surface of the roller may be provided at another location on the piston or may be provided on a separate component which is attached to the piston, for example by fasteners or by a welded joint. There may be one or more intervening components via which the curved bearing surface is connected to the piston head. The roller may be held captive between the curved bearing surface and the running surface such that it can rotate on the curved bearing surface but cannot leave the curved bearing surface unless the curved bearing surface and the track are moved apart from each other.

The curved bearing surface engaging the outer radial surface of the roller may comprise a lubricant outlet and/or a lubricant pick-up.

The roller may have an axial end face; wherein a retaining component is removably attached to the piston, the retaining component being located at the axial end face of the roller to prevent the roller from moving with respect to the piston in a direction aligned with its rotational axis beyond the retaining component. The retaining component may, for example, be attached to a piston head by one or more removable fasteners.

The contact patch between the curved bearing surface and the outer radial surface of the roller may extend through an angle of between 120 degrees and 330 degrees. Preferably the contact patch extends through an angle of more than 150 degrees or more than 180 degrees or more than 210 degrees or more than 240 degrees. Preferably the contact patch extends through an angle of less than 310 or less than 290 degrees. The contact patch may for example extend through an angle of approximately 270 degrees. At least a portion of the contact patch may, however, extend through a smaller angle, for example 90 degrees.

The contact patch between the curved bearing surface and the outer radial surface of the roller may be offset to one side of a plane passing through the central axis of rotation of the roller and aligned with the direction of movement of the piston within the cylinder. A central point of the contact patch may be offset to one side of the plane. The contact patch may be offset to one side of the plane such that an exposed portion of the outer surface of the roller which is not engaged by the bearing surface (that is the portion of the circumference of the roller around which the curved bearing surface does not extend) is also offset to one side of the plane. By offsetting the exposed portion of the roller to one side, the bearing can allow the geometry of the track and the location of the cylinder to be optimized while avoiding fouling of the track on piston head (or other component on which the curved bearing surface is provide). Alternatively, or in addition the bearing surface may be aligned with or offset towards a direction of maximum loading.

The cam surface may be shaped such that, as the track moves relative to the cylinder, the piston head moves in reciprocating motion within the cylinder in accordance with the path of the cam surface.

At least a portion of the cam surface may be provided with a coating or surface treatment. The coating or surface treatment may increase hardness and/or reduce friction. Alternatively, or in addition at least a portion of the cam surface may be provided on a separate component to a main body of the track, the separate component providing a harder and/or lower friction surface than the main body of the track.

The track may form a continuous loop which rotates relative to the cylinder about an axis of rotation, and the cam surface may form a continuous surface extending around the loop. Alternatively, there may be a break in the cam surface, for example a small discontinuity. The cam surface may be fixed with respect to the track, or alternatively the cam surface may include a fixed portion which is fixed with respect to the track and a moving portion which forms part of the cam surface and which is moveable with respect to the track, for example one or more rollers mounted to the track. The roller may be adapted to rotate about an axis of rotation, and may rotate freely, be partially constrained and/or be driven.

The cylinder may remain fixed while the track moves relative to the cylinder. Alternatively, the cylinder may move relative to a fixed track.

The roller may comprise a protrusion extending beyond its outer radial surface around its circumference which engages the track to prevent the roller from moving relative to the piston in a direction aligned with the rotational axis of the roller and/or the track may comprise a protrusion extending beyond the cam surface around its circumference which engages the roller to prevent the roller from moving relative to the piston in a direction aligned with the rotational axis of the roller. Where the roller comprises a protrusion, the track may comprise a corresponding recess or chamfer which engages the protrusion. Where the track comprises a protrusion the roller may comprise a corresponding recess or chamfer which engages the protrusion. One or more protrusions provided on the roller and/or the track may be located at one or both axial ends of the roller and/or at one or more intermediate positions between the axial ends of the roller.

The contact patch may be part cylindrical. Alternatively, the contact patch may additionally have curvature in a second direction aligned with the axis of rotation of the roller.

The track may further comprise a second cam surface facing in the opposite direction to the first cam surface; wherein the piston arrangement further comprises a second bearing having a roller and a curved bearing surface on which the roller is rotatably mounted such that the roller is held captive between the second cam surface and the bearing surface; wherein the bearing surface engages the roller via a contact patch which extends only a portion of the distance around the circumference of the roller. The second bearing may have some or all of the features described above in relation to the first bearing. The roller of the first bearing may be adapted to move the piston in a first direction in accordance with the path of the first cam surface and the roller of the second bearing may be adapted to move the piston in an opposing second direction in accordance with the path of the second cam surface. The component may therefore be constrained in both directions and move in reciprocating motion in accordance with the path of the track. The opposing first and second running surfaces may oppose each other by facing outwardly away from each other or alternatively by facing inwardly towards each other.

The track may comprise first and second track portions located on opposite sides of the piston, each track portion providing a respective cam surface. A common roller may engage the cam surfaces of both the first and second track portions. The common roller may extend through the piston. Alternatively, two separate rollers may be provided on alternate sides of the piston, each roller engaging a respective one of the first and second track portions. The first and second track portions may each comprise a first cam surface and a second cam surface facing in the opposite direction with first and second bearings operating on each of the respective first and second cam surfaces.

The track may be a radial track with the cam surface arranged as inner radial or outer radial surface with respect to an axis of rotation of the track relative to the cylinder.

The cylinder may have a central axis, wherein the cylinder axis does not pass through the axis of rotation of the track relative to the cylinder. In this case the component does not follow purely radial motion towards and away from the center of the track but instead moves at an acute angle to the radius line. The axis of rotation of the track relative to the cylinder may be offset from the cylinder axis by a distance equal to at least 10% or at least 25% or at least 50% or at least 75% or at least 100% or more than 100% of the piston stroke length. The axis of rotation of the track relative to the cylinder may be offset from the cylinder axis by an angle of at least 2 degrees or at least 5 degrees or at least 10 degrees or at least 15 degrees or up to 20 degrees when taken from the rotational axis of the roller. By arranging the cylinder axis at an angle to the axis of rotation of the track the geometry of the piston arrangement and track may be optimized for efficient transfer of power from the piston to the track and/or vice-versa. Arranging the piston at an angle may also allow the gradient of the track to be optimized.

The track may be an annular track with the cam surface arranged facing in a direction parallel to an axis of rotation of the track relative to the cylinder. Where such a track comprises first and second track portions on alternate sides of the component, the first and second track portions are preferably arranged concentrically such that an annular gap is formed between the edge surfaces of the first and second track portions. The piston may have a stabilizing portion extending between the first and second portions as described in relation to the first aspect of the invention.

The cylinder may have a central axis, wherein the cylinder axis is not parallel to the axis of rotation of the track relative to the cylinder. The cylinder axis may be offset from the axis of rotation of the track relative to the cylinder by at least 2 degrees or at least 5 degrees or at least 10 degrees or at least 15 degrees or up to 20 degrees. By arranging the cylinder axis at an angle to the axis of rotation of the track the geometry of the piston arrangement and track may be optimized for efficient transfer of power from the piston to the track and/or vice-versa. Arranging the piston at an angle may also allow the gradient of the track to be optimized.

The roller may comprise a tapered shape such that its diameter at a radially inner-most edge of the cam surface is smaller than its diameter at a radially outer-most edge of the cam surface. The taper accounts for the difference in path length between the inner-most part of the track and the outer-most part of the track, thereby allowing the roller to roll more smoothly over the track without skidding or slipping.

An internal combustion engine may comprise a piston operated by a bearing arrangement according to the second aspect of the invention. Alternatively, the piston arrangement of the second aspect may be used in any other application, for example in a pump.

A third aspect of the invention provides a piston arrangement including a piston moveable within a cylinder and a track having a cam surface which is adapted to move relative to the cylinder; wherein the piston is coupled to the track by a bearing which runs on the cam surface; wherein the bearing comprises a roller and a curved bearing surface; wherein the roller has a radial outer surface which runs on the cam surface; wherein the curved bearing surface engages an outer redial surface of the roller such that the roller is held captive between the bearing surface and the cam surface; wherein the bearing surface engages the roller via a contact patch which extends only a portion of the distance around the circumference of the roller such that a portion of the radial outer surface of the roller is exposed so that it can run on the cam surface.

A fourth aspect of the invention provides an internal combustion engine comprising a piston arrangement including a piston coupled to a track; wherein the track is coupled to a shaft and has a cam surface, and the piston has a follower which runs on the cam surface of the track to control motion of the piston; the engine further comprising a casing including first and second casing elements, wherein the first casing element meets the second casing element at an interface and the first piston moves in reciprocating motion within a bore which passes through the interface between the first and second casing elements.

The bore within which the piston moves may be provided by a separate cylinder which is attached to the first and second casing elements. Alternatively, the bore may be formed directly in the first and second casing elements. A bore formed in the first and second casing elements may additionally be provided with a cylinder liner. More than one piston may be coupled to the track. For example, two opposing pistons may be coupled to the track on opposite sides of the shaft, which each piston moving within its own respective bores which passes through the interface between the first and second casing elements. The track is preferably a radial track as described above in relation to the preceding aspects of the invention. The track preferably has a central hole which receives the shaft and is mounted on the shaft by feeding the shaft through the central hole. Relative rotation between the track and the shaft is preferably achieved by a splined or keyed interface between the tracks and the shaft.

A power transfer mechanism including a piston with a follower coupled to an output shaft by a track with a cam surface is larger and may be more difficult to assemble than a conventional power transfer mechanism using a crankshaft and con rod. By adapting the engine casing to be assembled around the piston and the track after the piston has been coupled to the track the engine is easier to design and assemble. By arranging the casing with a split line between adjacent casing elements at the location of the bore, the first and second casing elements may be readily assembled around the piston and track after the piston has been coupled to the track and the track has been coupled to the shaft.

The track may have first and second cam surfaces facing in opposite directions and the piston may have first and second followers which respectively run on the first and second cam surfaces of its respective track; wherein the piston is coupled to its respective track by engaging the first cam surface with the first follower and engaging the second cam surface with the second follower. The first follower and first cam surface may be adapted to move the piston in a first direction and the second follower and second cam surface may be adapted to move the piston in a second direction opposing the first direction. The track may be held captive between the first and second followers, or alternatively the first and second followers may be held captive between the first and second cam surfaces.

The track may comprise first and second track portions, each track portion having a cam surface; wherein the piston is coupled to the track via the cam surfaces of the first and second track portions. The cam surfaces of the first and second track portions may each be engaged by a common follower or alternatively two separate followers may be provided, each follower engaging the cam surface of a respective one of the track portions. The piston may include a stabilizing element extending between the first and second track portions. Each track portion may comprise first and second cam surfaces facing in opposite directions, with a follower running on each of the first and second cam surfaces. The track portions may be separated from each other by a spacer mounted on the shaft, for example an annular sleeve type spacer.

A plate-like locating element may be provided between the first and second track portions, the locating element acting to stabilize the piston and prevent movement of the piston between the first and second track portions.

The interface between the first and second casing elements may be substantially planar. The interface may lie in a plane which is substantially perpendicular to the axis of the shaft. Alternatively, the interface may follow any other contour, may not lie in a plane perpendicular to the shaft, and/or may be spliced or include other overlapping features.

The internal combustion engine may further comprise a second piston coupled to a second track; wherein the second track is coupled to the shaft and has a cam surface, and the second piston has a follower which runs on the cam surface of the second track to control motion of the second piston; the casing further including a third casing element, wherein the second casing element meets the third casing element at an interface and the second piston moves in reciprocating motion within a bore which passes through the interface between the second and third casing elements.

Where an engine comprises multiple tracks operating multiple pistons, a plurality of casing elements are provided along the length of the shaft such that each piston moves in reciprocating motion within a bore extending through an interface between two adjacent casing elements. The engine may generally include any number of tracks spaced apart along the shaft, each track being coupled to one or more pistons. Two casing elements are brought together around the (or each) piston coupled to each track. Therefore for each additional track the engine includes an additional casing element such that a casing element is located between each pair of adjacent tracks. For example, an engine having only one track will have a pair of end casing elements which meet at an interface around the (or each) piston coupled to the single track. Each of the end casing elements will partially enclose the bore within which the (or each) piston coupled to the single track moves. An engine having only two tracks will have a pair of end casing elements and an intermediate casing element located between the pair of tracks, the intermediate casing element meeting one of the end casing elements at an interface through which the (or each) piston coupled to one of the tracks passes and meeting the other one of the end casing elements at an interface through which the (or each) piston coupled to the other one of the tracks passes. An engine having only three tracks, the casing will include a pair of end casing elements, an intermediate casing element located between the first and second tracks and another casing element located between the second and third tracks.

A common design of casing elements may be used in the assembly of various different engines having different numbers of track/piston arrangements. The number of different components required for producing multiple different designs of engine may therefore be reduced.

Each casing element may at least substantially surround the shaft. A gap or aperture may be provided in at least one of the casing elements which opens into a sump. Alternatively, at least one of the casing elements may not extend around the shaft. An end casing element may be open at its inwardly facing end to interface with the adjacent casing element and closed at its outwardly facing end to seal the end of the engine casing. An intermediate casing element (located between two adjacent tracks where the engine comprises multiple tracks) is generally open at both ends to interface with adjacent casing elements on both sides. The casing elements may be cast and/or machined.

The casing elements may be attached together by a plurality of fasteners passing through each of the casing elements. The fasteners may be, for example, bolts or threaded bars. The casing elements may be attached together by a single set of fasteners passing through all of the casing elements, or alternatively each casing element may be individually attached to the adjacent casing element(s). One or more dowel pins may additionally pass through at least two adjacent casing elements.

A fifth aspect of the invention provides a method of assembling an internal combustion engine comprising a piston arrangement including a piston coupled to a track; wherein the track is coupled to a shaft and has a cam surface, and the piston has a follower which runs on the cam surface of the track to control motion of the piston; the engine further comprising a casing including first and second casing elements, wherein the first casing element meets the second casing element at an interface and the first piston moves in reciprocating motion within a bore which passes through the interface between the first and second casing elements; the method including the steps of:

a) coupling the first piston arrangement to the shaft by coupling the first track to the shaft and coupling the first piston to the first track;

b) bringing the first and second casing elements together around the first piston after the first piston arrangement has been coupled to the shaft; and c) coupling the first and second casing elements together using one or more fasteners.

The first and second casing elements may both be moved into position with respect to the shaft at the same time after the first piston arrangement has been coupled to the track or alternatively at different times after the first piston arrangement has been coupled to the track. Alternatively, either one of the casing elements may be moved into position before the first piston arrangement has been coupled to the shaft and the other casing element may be moved into position (such that the first and second casing elements are brought together) after the first piston arrangement has been coupled to the shaft.

As stated above, a power transfer mechanism including a piston with a follower coupled to an output shaft by a track with a cam surface is larger and may be more difficult to assemble than a conventional power transfer mechanism using a crankshaft and con rod. By adapting the engine casing to be assembled around the piston and the track after the piston has been coupled to the track the engine is easier to design and assemble. In particular the technician assembling the engine has enough space to couple the first piston to the first track and couple the first track to the shaft because he has full access from at least one side of the piston arrangement.

The internal combustion engine may further comprise a second piston coupled to a second track; wherein the second track is coupled to the shaft and has a cam surface, and the second piston has a follower which runs on the cam surface of the second track to control motion of the second piston; the casing further including a third casing element, wherein the second casing element meets the third casing element at an interface and the second piston moves in reciprocating motion within a bore which passes through the interface between the second and third casing elements. The method may further include the steps of:

d) coupling the second piston arrangement to the shaft by coupling the second track to the shaft and coupling the second piston to the second track;

e) bringing the second and third casing elements together around the second piston after the second piston arrangement has been coupled to the shaft; and f) coupling the first and second casing elements together and coupling the second and third casing elements together using one or more fasteners, wherein the second casing element is positioned between the first and second pistons before the first and second piston arrangements have both been coupled to the shaft.

The second casing element (which is an intermediate casing element located between two adjacent piston arrangements associated with two adjacent separate tracks) is brought into position with respect to the shaft before both of the first and second piston arrangements have been coupled to the track. In this way it is possible to move the second casing element into position without fouling on the tracks of the pistons. The second casing element may be brought into position either before either of the first and second piston arrangements has been coupled to the shaft or alternatively after one of the piston arrangements has been coupled to the shaft but before the other piston arrangement has been coupled to the shaft.

The first, second and third casing elements may all be coupled together at the same time, for example using a common set of fasteners. Alternatively, the first and second casing elements may be coupled together using a first set of fasteners and the second and third casing elements may be coupled together separately using a second set of fasteners.

The method of the fifth aspect of the invention may be used to assemble an engine having any number of tracks spaced apart along a shaft, each track forming part of a piston arrangement. In this case each intermediate casing element (located between two adjacent tracks) is brought into position before the piston arrangements on both sides have been coupled to the shaft, although generally after the piston arrangement on one side has been coupled to the shaft. Each end casing element is brought into position after the piston arrangement arranged at that far end of the shaft has been brought into position.

Where the engine includes one or more locating elements positioned between two adjacent track portions, the method may further comprise the step of positioning the locating element between the first and second track portions before attaching the plurality of casing elements together to form a casing around the piston and the track. The internal combustion engine of the fourth aspect may comprise a piston arrangement according to any of the first, second and/or third aspects of the invention, and the method of the fifth aspect of the invention may be used to assemble an internal combustion engine comprising a piston arrangement according to any of the first, second and/or third aspects of the invention.

DETAILED DESCRIPTION

Figure 1:
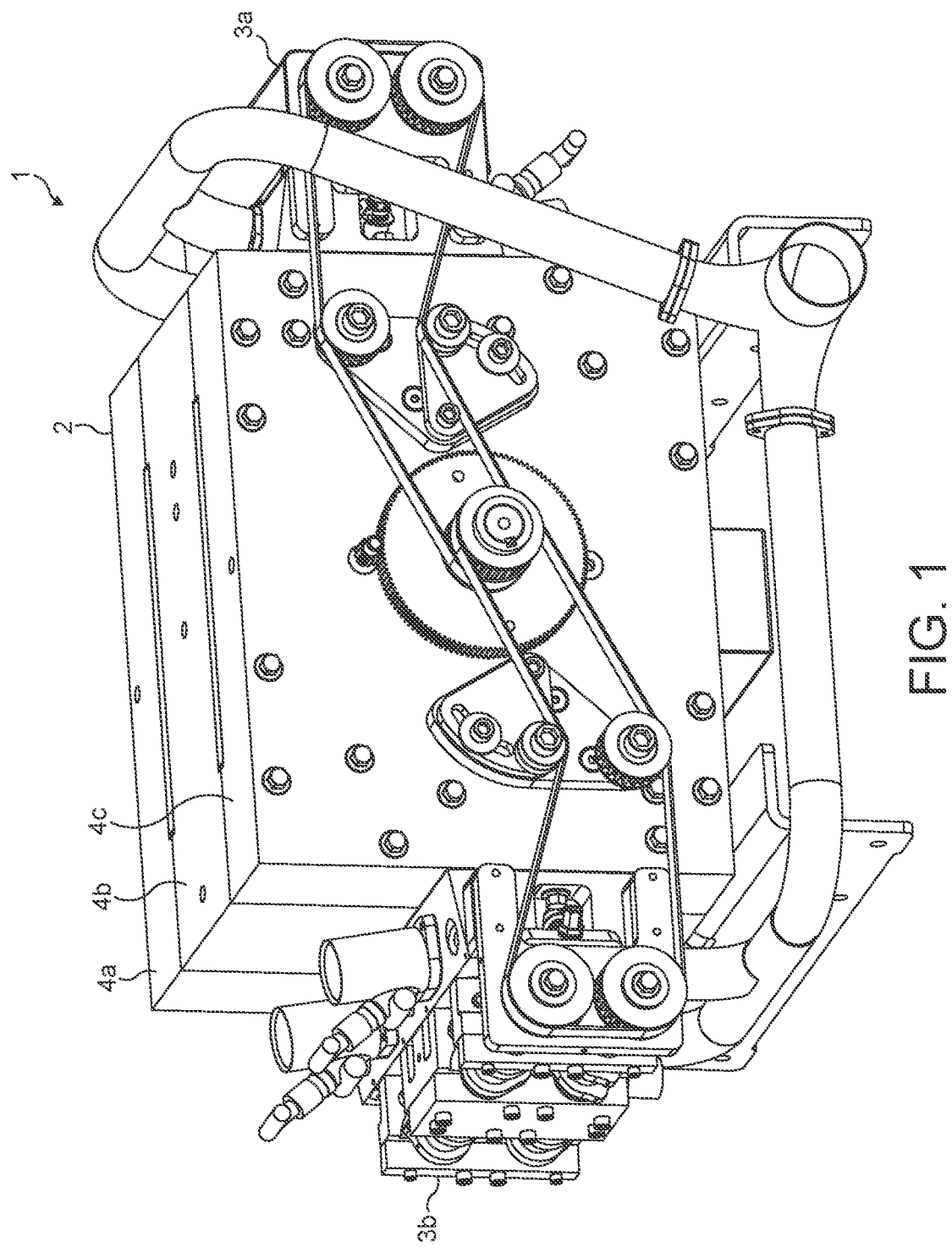
FIG. 1 shows an engine.
Figure 2:
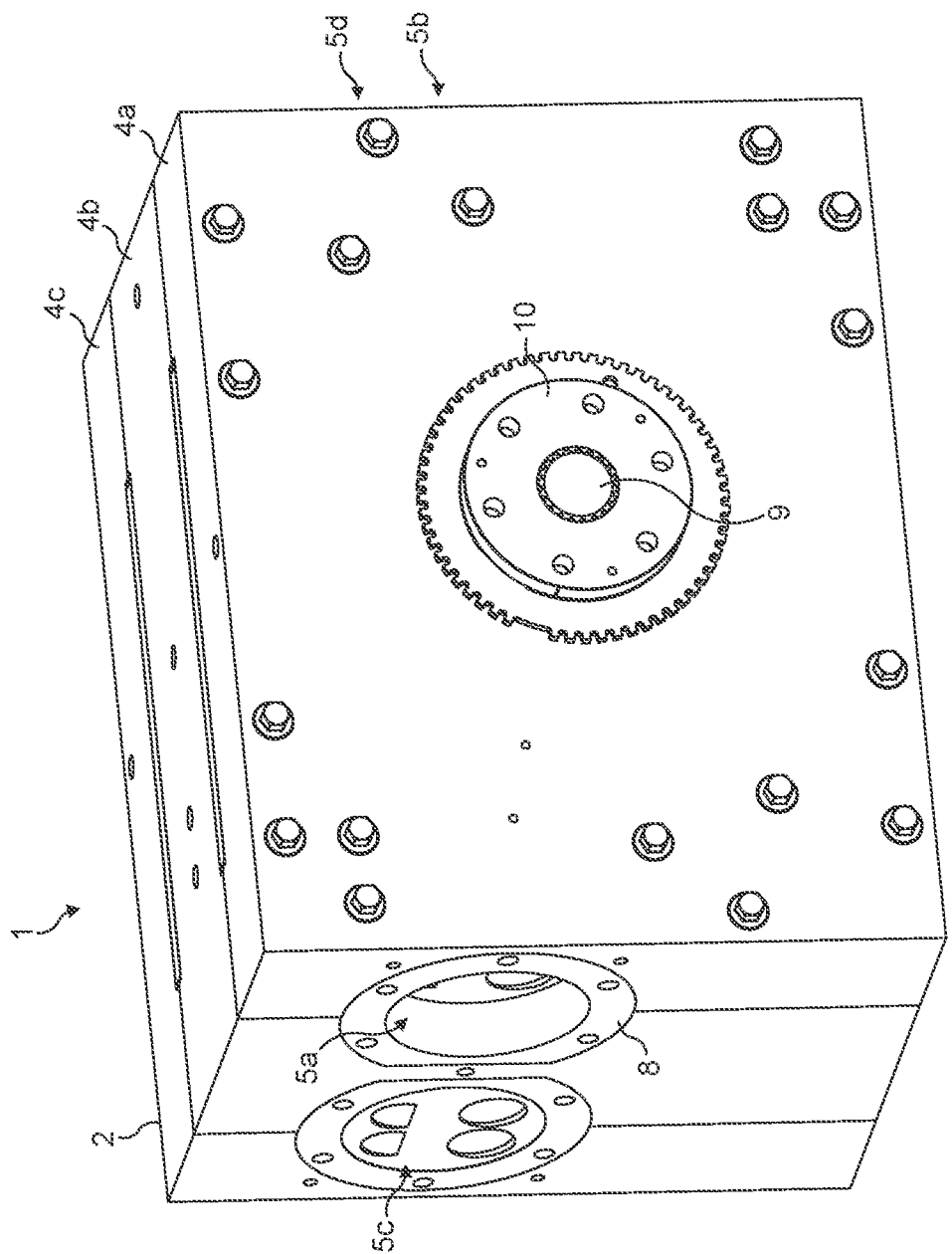
FIG. 2 shows the engine with various components omitted.
Figure 3:
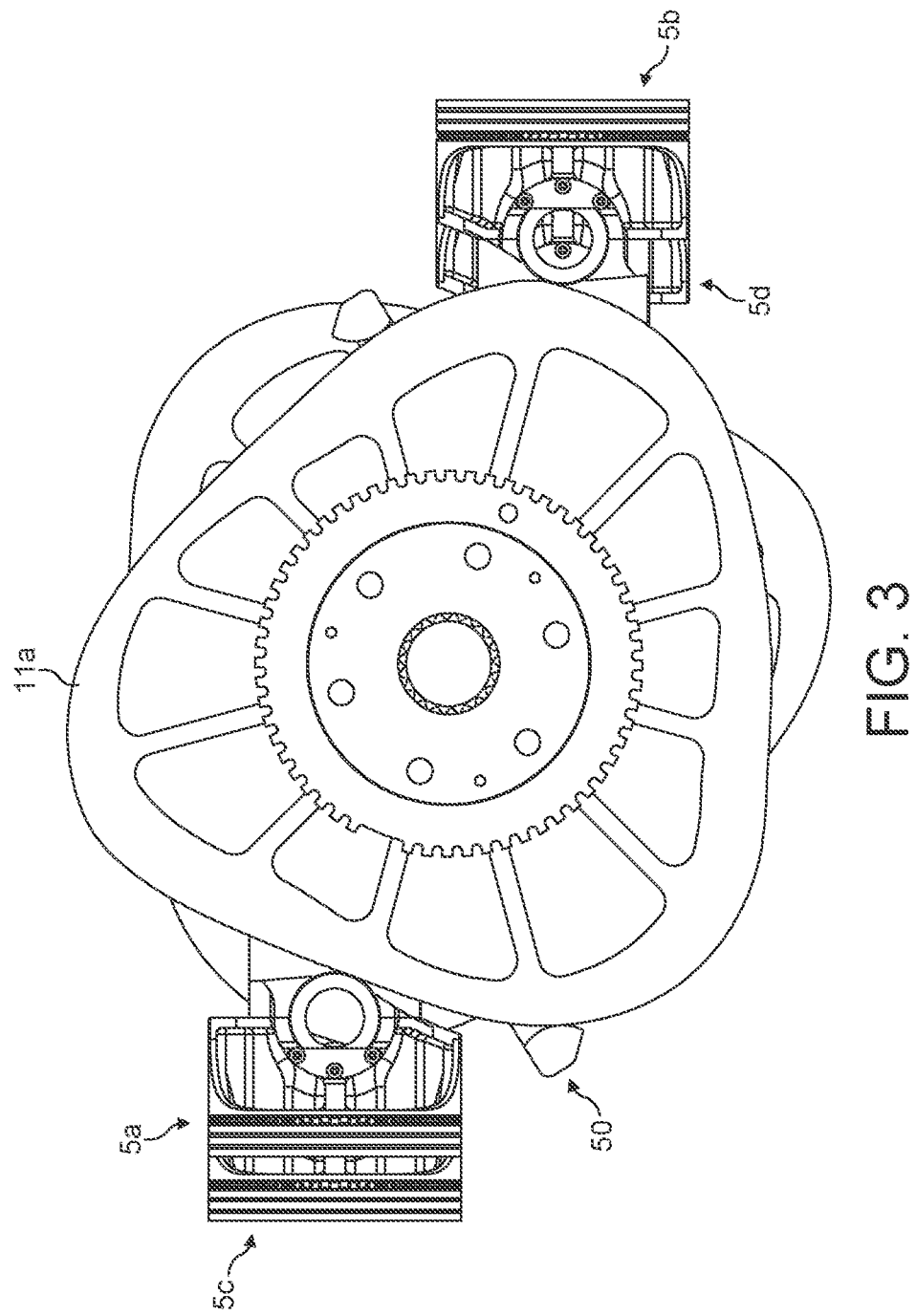
FIG. 3 shows an end view of the engine with the casing omitted.
Figure 4:
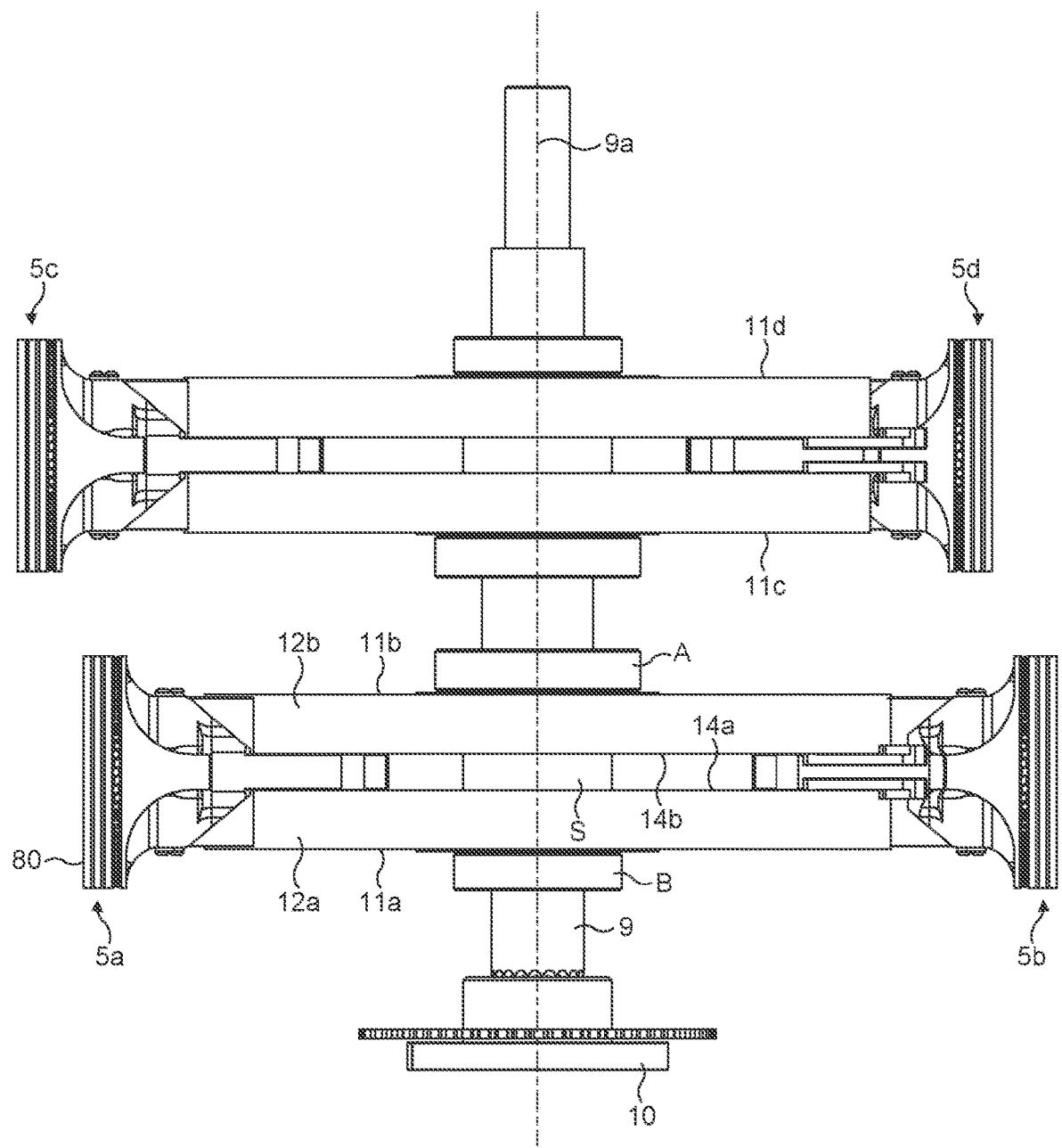
FIG. 4 shows a top view of the engine with the casing omitted.

FIG. 1 shown as internal combustion engine 1 comprising a block assembly 2 and two head assemblies 3a, 3b and an exhaust system. FIG. 2 shows the engine 1 with the head assemblies 3a, 3b and exhaust system omitted. The head assemblies and exhaust system will not be discussed in detail because they do not form part of the invention. The block assembly 2 comprises three casing members 4a, 4b, 4c, in which four piston assemblies 5a, 5b, 5c, 5d are mounted. FIGS. 3 and 4 respectively show end and top views of the engine 1 with the casing members 4a, 4b, 4c, removed so that the piston assemblies 5a, 5b, 5c, 5d are visible. FIGS. 5A, 5B, 6A and 6B show the first piston assembly 5a with the second third and fourth piston assemblies 5b, 5c, 5d omitted for clarity. The structure and functioning of the first piston assembly will be described in detail, although it will be appreciated that the second, third and fourth piston assemblies are structurally and functionally similar to the first piston assembly.

The first piston assembly 5a comprises a piston 80 with a piston head 7 (shown in FIGS. 7A to 7E) moveable within a cylinder sleeve 8 (visible in FIG. 2). The piston head 7 is coupled to an output shaft 9 having an axis of rotation 9a and an output flange 10 via a track comprising first and second track portions 11a, 11b. Each track portion 11a, 11b is mounted on and rotationally fixed with respect to the output shaft 9 via a splined connection (not visible). The track portions 11a, 11b rotate with the output shaft 9 about the axis of rotation 9a relative to the piston head 7 and the cylinder sleeve 8.

Each track portion 11a, 11b has a radially outer cam surface 12a, 12b extending around its circumference. Each track portion also has a radially inner cam surface 13a, 13b located on an underside of an overhanging portion, the inner cam surfaces facing away from the outer cam surfaces, i.e. in the opposite direction. A planar edge surface 14a, 14b extends between the outer and inner cam surfaces of each track portion.

FIGS. 7A, 7B, 7C and 7D show side, front, rear and perspective views of the piston of the first piston assembly 5a. The piston includes the piston head 7, a stabilizing element or blade element 15 connected to and extending below the piston head, and a cap element 16 connected to and extending below the stabilizing element. The stabilizing element 15 and cap element 16 are connected to the piston head 7 by bolts 17. The piston further includes first and second cylindrical rollers 18, 20 rotatably mounted within the piston.

The first roller 18 has a cylindrical outer radial surface which bears against a pair of part-cylindrical contact patches 19a formed on the underside of the piston head 7 (that is the side opposing the working face) on each side of the piston (that is on opposite sides of the stabilizing element 15). The part-cylindrical contact patches 19a each extend only a portion of the distance around the circumference of the roller 18 so they do not fully enclose the roller but instead leave portions 18a of the radial outer surface of the roller exposed underneath the part-cylindrical contact patches 19a (as shown in FIGS. 7A to 7D). The exposed portions 18a run on the outer cam surfaces 12a, 12b of the track 11a, 11b and transmit load between the piston and the track. Since the part-cylindrical bearing surfaces 19a are located directly above the contact patches between the roller 18 and the outer cam surfaces 12a, 12b of the track the roller can efficiently transmit load directly between the piston and the track.

The part-cylindrical contact patches 19a extend through an angle α1 of approximately 90 degrees about the axis of rotation of the roller 18 at their narrowest outer-most portions (that is the ends furthest from the main body of the stabilizing element 15) and through an angle of approximately 270 degrees at their widest, inner-most portions. The roller 18 also engages the piston via an additional full-cylindrical contact patch 19b located between the part-cylindrical contact patches 19a, as shown in FIG. 7E. However, the full-cylindrical contact patch 19b is located between the cam surfaces 12a, 12b at a location where the roller does not engage the track and so no portion of the outer radial surface of the roller is required to be left exposed at this location.

Figure 5A:
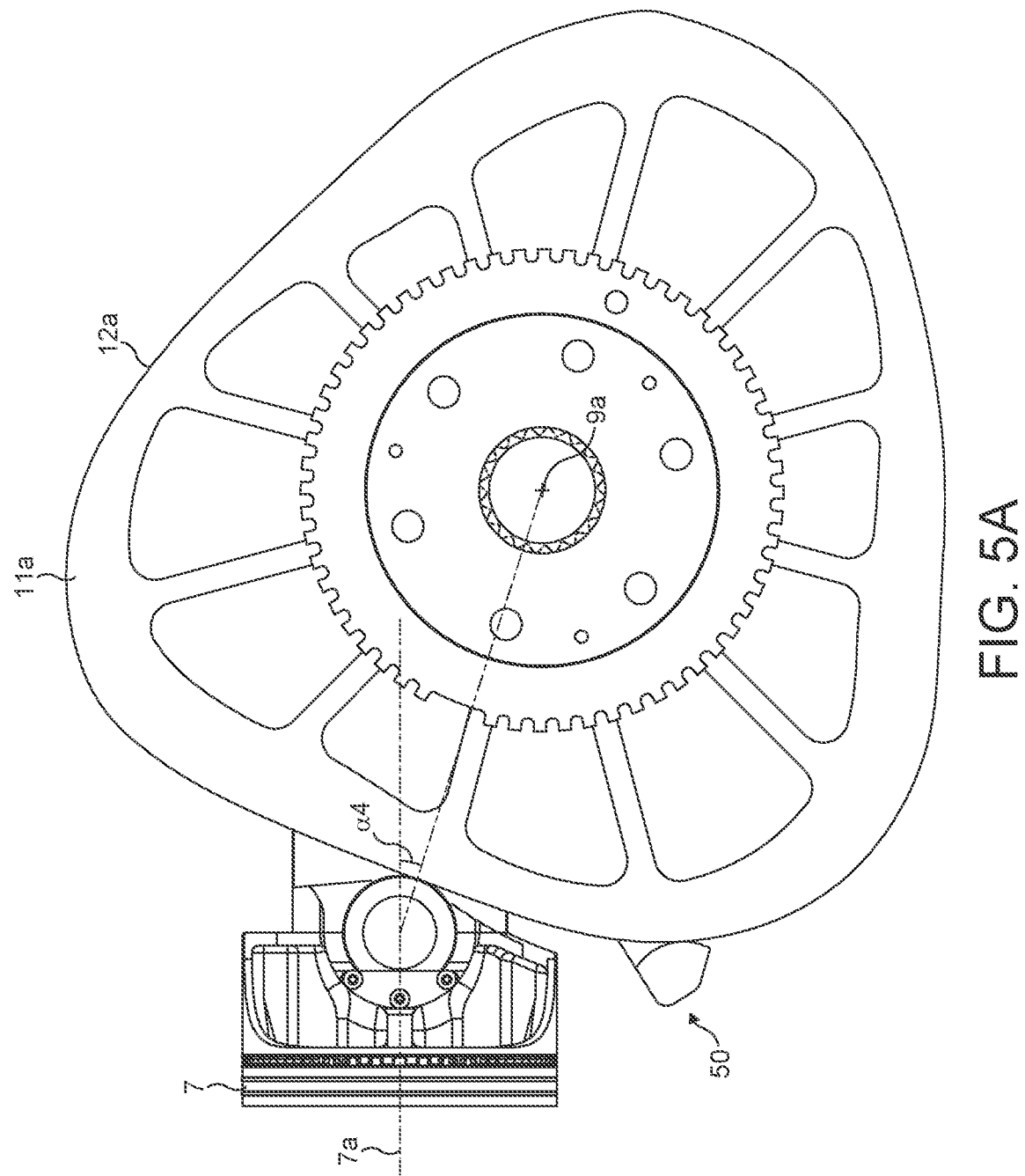
FIGS. 5A, 5B, 6A, and 6B show the power transfer mechanism for one of the pistons in the engine with certain components omitted.
Figure 5B:
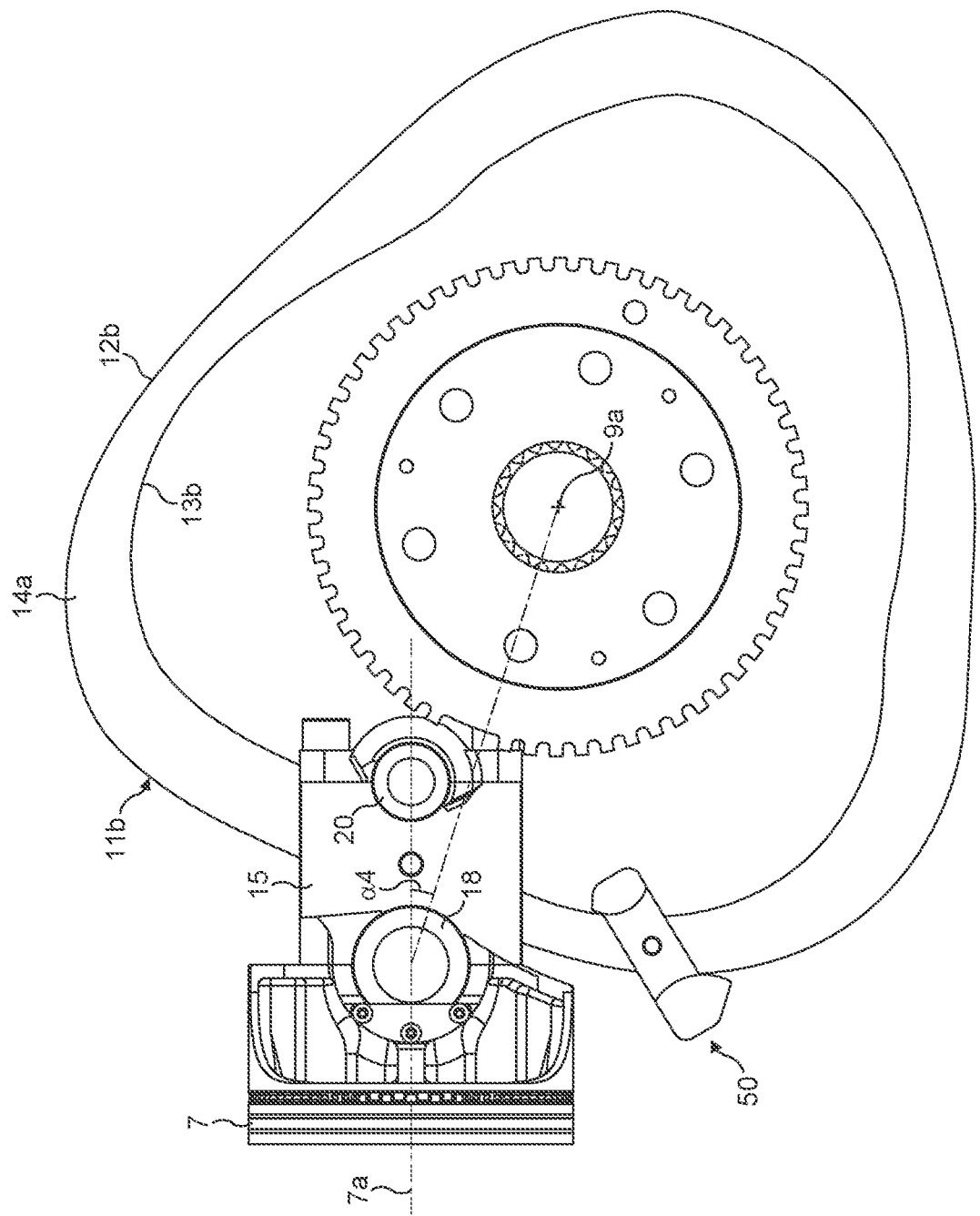
Figure 6A:
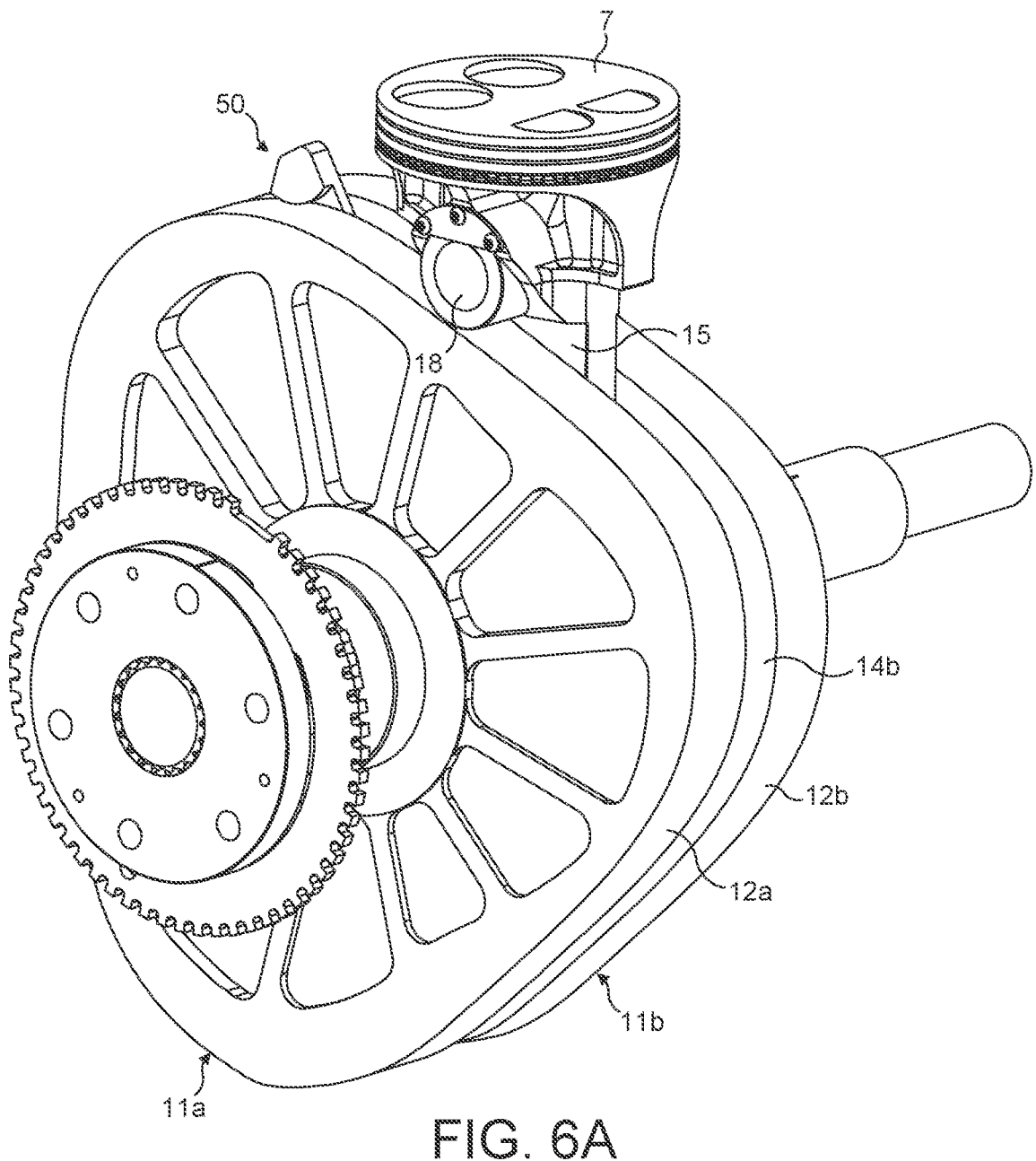
Figure 6B:
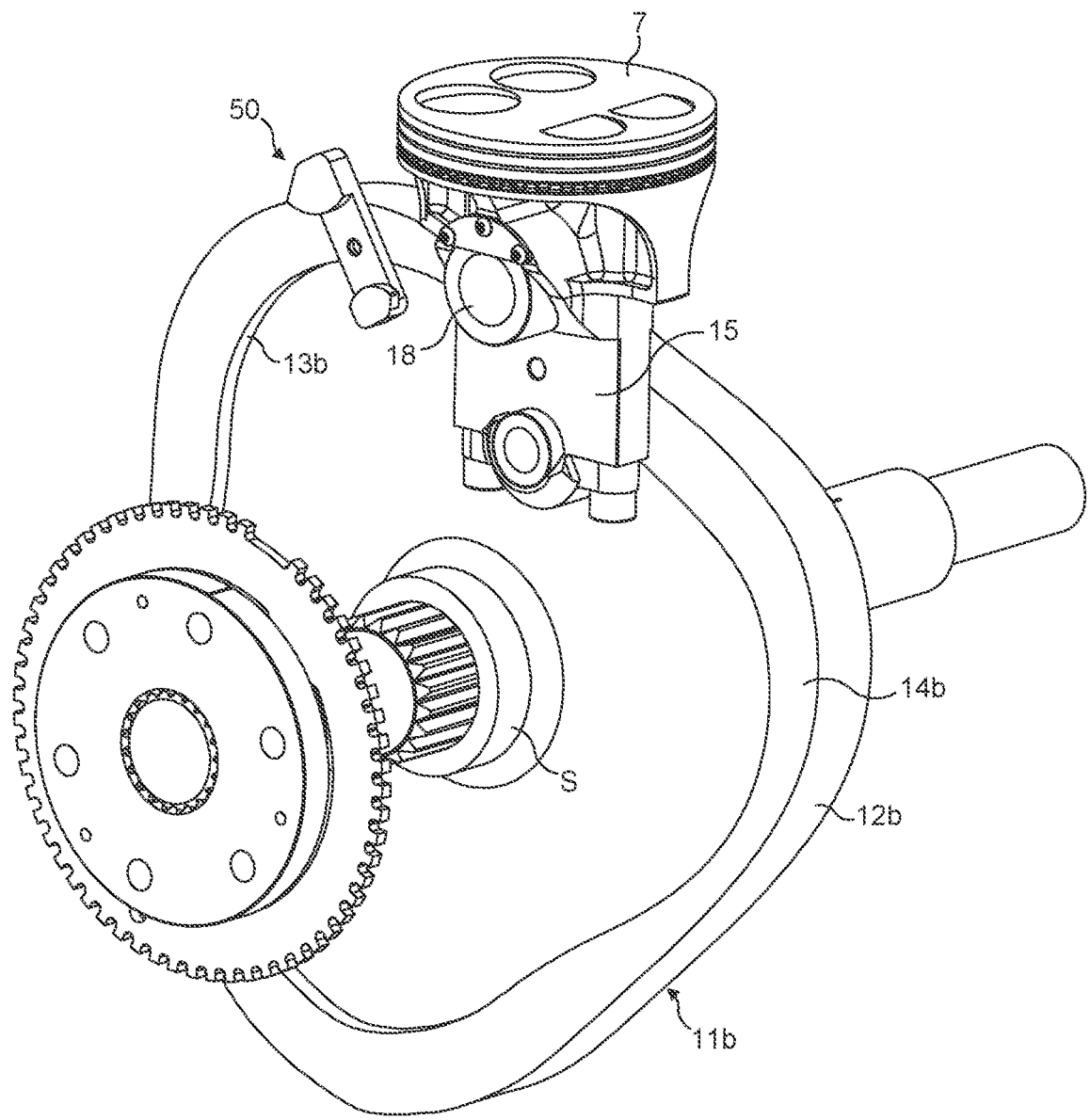
Figure 7A:
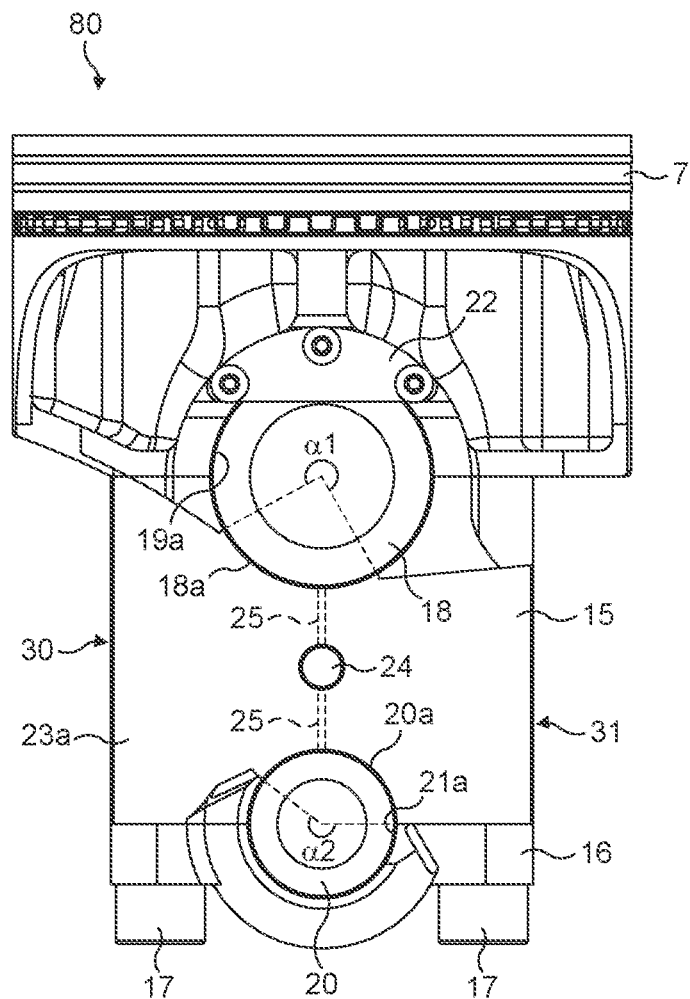
FIGS. 7A to 7E show a piston from the engine.
Figure 7B:
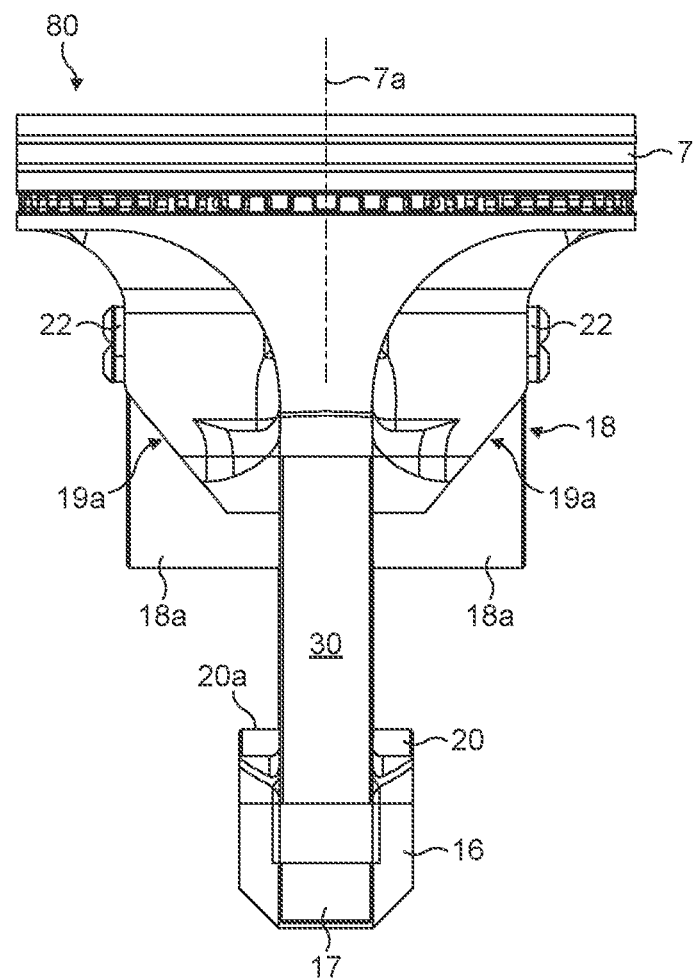
Figure 7C:
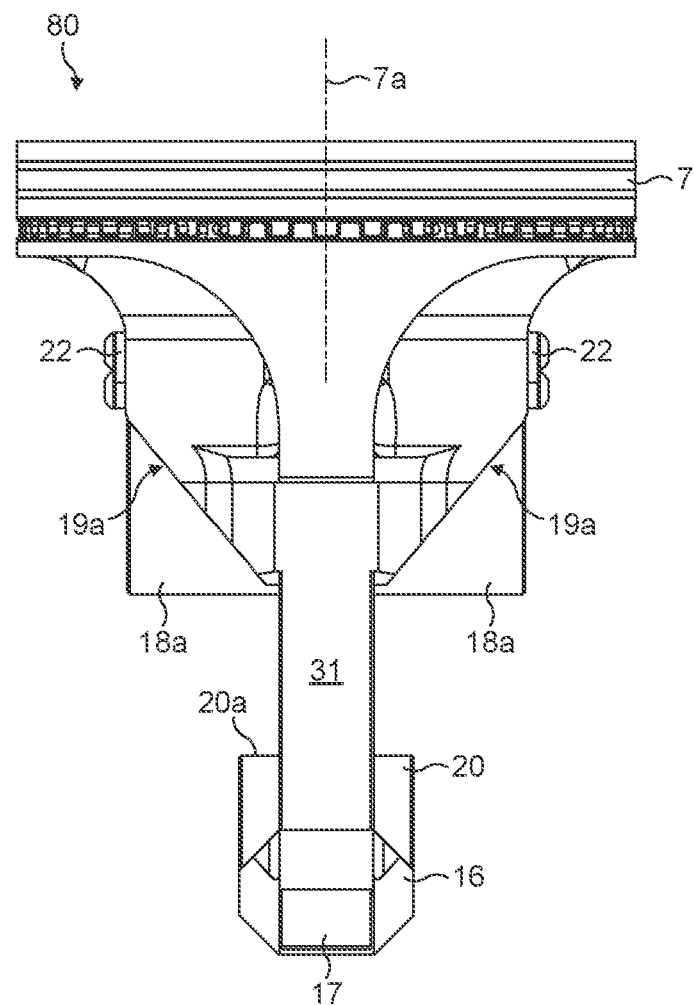
Figure 7D:
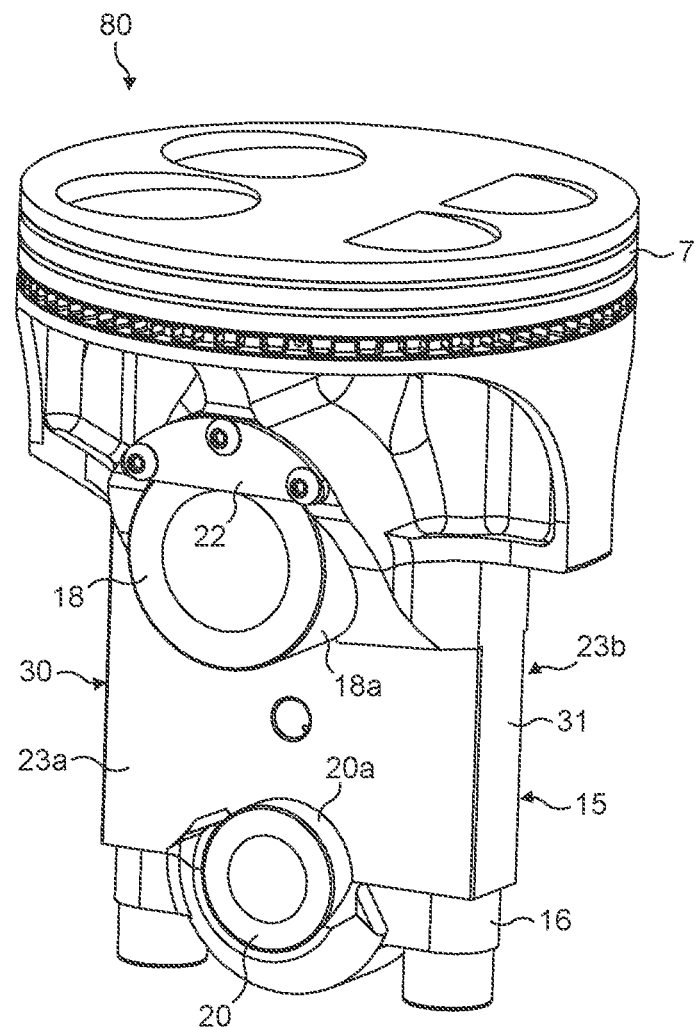
Figure 7E:
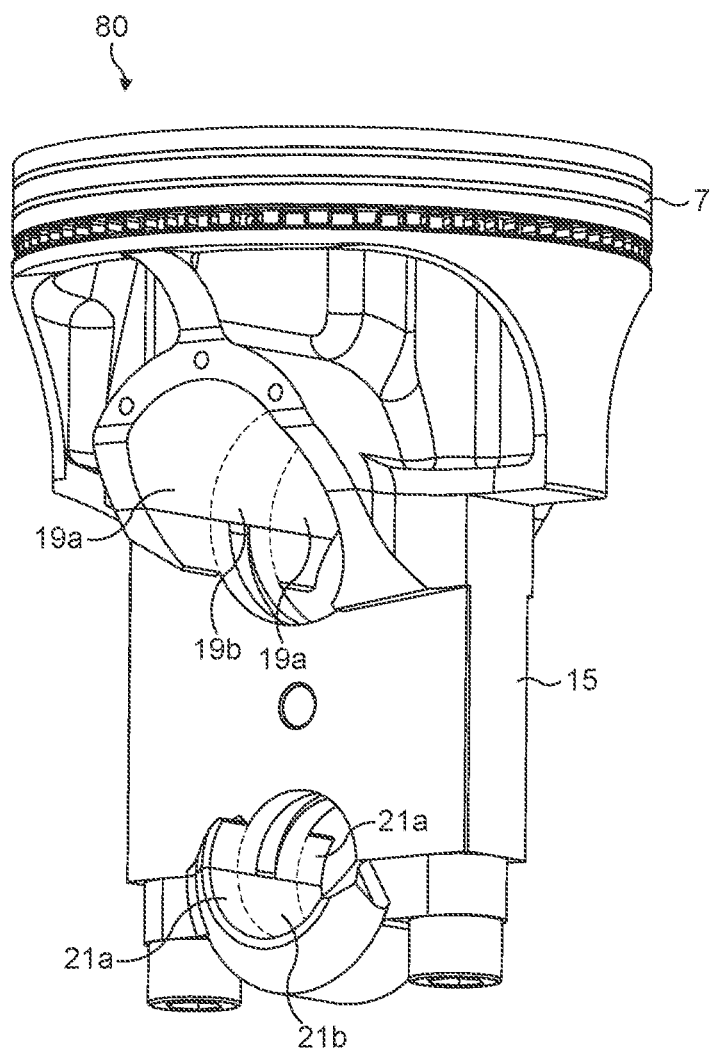

As can be seen in FIG. 7A, the part-cylindrical contact patches 19a are not located symmetrically with respect to the central axis 7a of the piston head 7 but instead each of the contact patches is offset to one side of the piston axis when the piston is viewed from the direction of the rotational axis of the roller 18. This offset allows the exposed portions 18a of the roller to be offset to one side of the piston to allow clearance for the track 11a, 11b which would otherwise foul on the piston. This is especially important in the embodiment shown in FIG. 3 where the piston axis is not arranged radially but is instead angularly offset from the axis of rotation of the track, as can be seen in FIGS. 3 and 5A and as will be discussed in more detail below. The first roller 18 is prevented from moving axially by keeper plates 22 (shown in FIG. 7A) which are bolted to the piston head at each axial end of the roller.

The second roller 20 has a cylindrical outer radial surface which bears against a pair of part-cylindrical contact patches 21a formed on the upper side of the cap element 16 on each side of the piston. The part-cylindrical contact patches 21a each extend only a portion of the distance around the circumference of the roller 20 (through an angle α2) so they do not fully enclose the roller but instead leave portions 20a of the radial outer surface exposed above the part-cylindrical contact patches 21a. The exposed portions 20a run on the inner cam surfaces 12a, 12b to transmit load between the piston and the track 11a, 11b. As can be seen in FIG. 7A, the part-cylindrical contact patches 21a are offset in a similar manner to the part-cylindrical contact patches 19a which engage the first roller 18. The second roller 20 also has a smaller diameter and a lighter construction than the first roller because the peak loads transmitted between the piston and the track by the second roller are lower than the peak loads transmitted between the piston and the track by the first roller.

Figure 8:
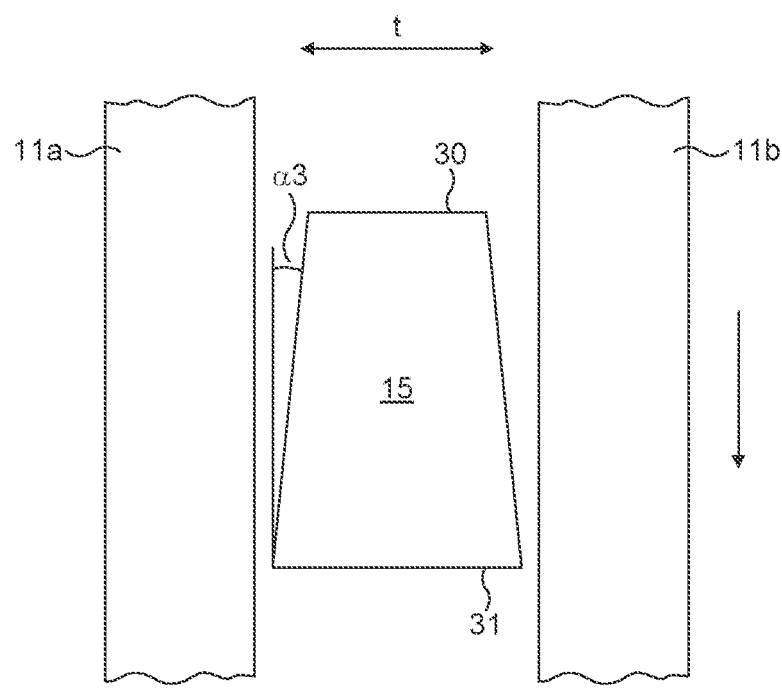
FIG. 8 shows a cross section through the power transfer mechanism for one of the pistons in the engine.

The stabilizing element 15 comprises first and second contact surfaces 23a, 23b (shown in FIG. 7D) which respectively engage the edge surfaces 14a, 14b of the track 11a, 11b via an oil film to stabilize the piston relative to the track. The contact surfaces 23a, 23b are substantially planar to correspond to the planar edge surfaces of the track. However, the stabilizing element comprises a taper in its thickness t across its extent in a direction parallel to the direction of relative motion between the stabilizing element and the track (indicated by an arrow in FIG. 8) such that the clearance distance between the contact surfaces 23a, 23b of the stabilizing element and the edge surfaces 14a, 14b of the track 11a, 11b decreases from the front to the rear of the stabilizing element (the front being defined as the end which faces towards the oncoming track, i.e. the edge towards the top of the page in FIG. 8). The stabilizing element may, for example, have a taper angle α3 of approximately 0.03 degrees. The tapered shape of the stabilizing element 15 causes the stabilizing element to center itself under the action of hydrostatic pressure as the track moves relative to the piston, thereby stabilizing the piston. A cross section of the stabilizing element and track taken in a plane perpendicular to the axis of movement of the piston is shown in FIG. 8 with the taper exaggerated for illustrative purposes.

Figure 9A:
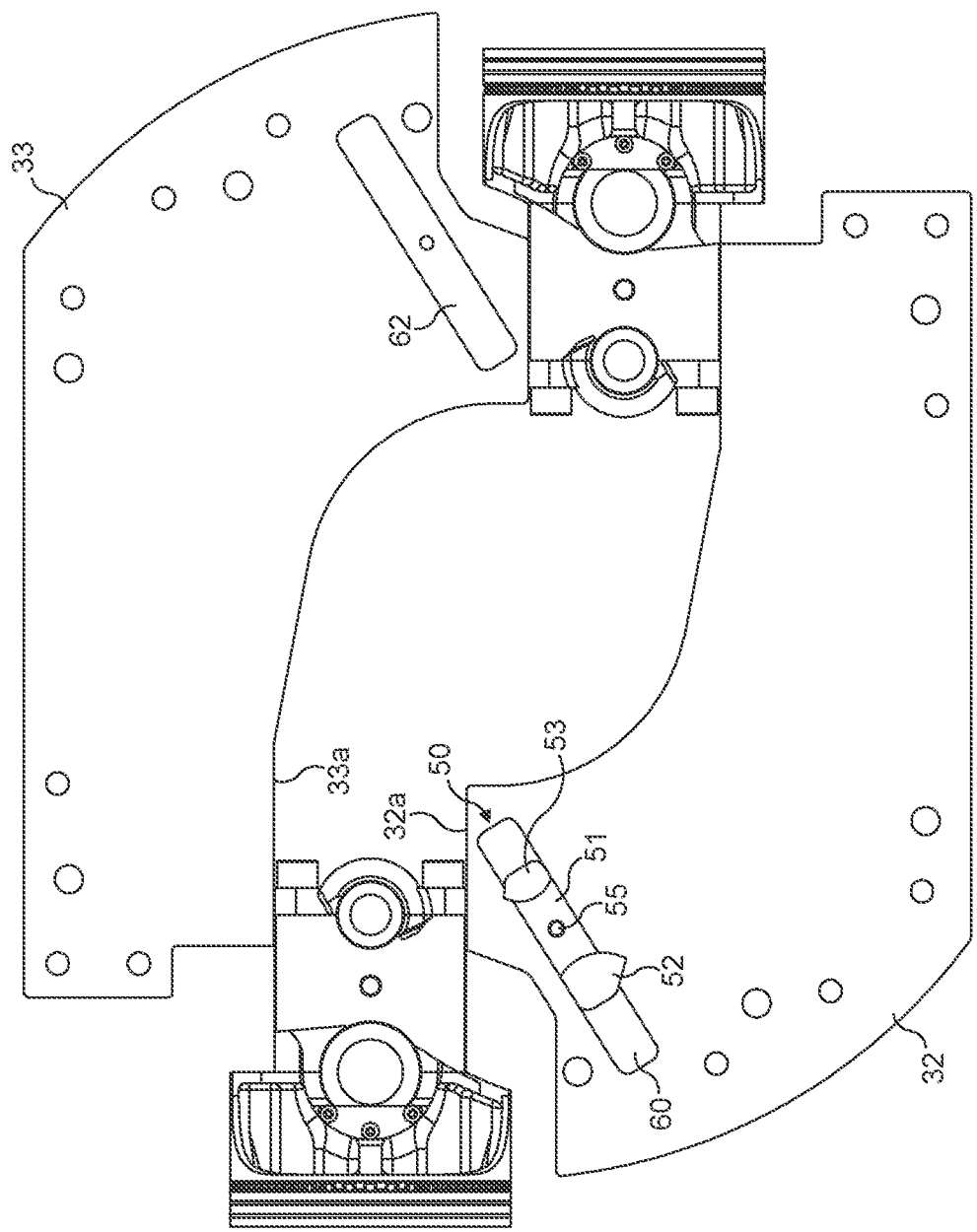
FIGS. 9A and 9B shows two of the pistons from the engine and locating elements used to stabilize the pistons and an oil delivery mechanism.

The stabilizing element 15 comprises first and second end surfaces 30, 31 between which the contact surfaces 23a, 23b extend. The first and second end surfaces 30, 31 engage and slide against first and second locating surfaces 32a, 33a provided on first and second locating elements 32, 33, as shown in FIG. 9A. (The locating elements are not shown in FIGS. 3 to 6B to improve clarity.) The locating elements are plate-like elements which are positioned between the first and second track portions 11a, 11b and bolted to the casing members 4a, 4b, 4c when the engine is fully assembled. (The locating elements are omitted from FIGS. 3 to 7 so that the piston tracks and pistons are not obstructed). The locating elements 32, 33 prevent the stabilizing element 15 from moving forwards and backwards or rotating within the slot formed between the track portions. As can be seen in FIG. 9A, the same pair of locating elements are also used to locate the stabilizing element of the piston of the second piston assembly 5b.

The stabilizing element 15 comprises an oil pick-up 24 having openings in its contact surfaces 23a, 23b adapted to receive oil from the oil film on the edge surfaces 14a, 14b of the track 11a, 11b. Oil is supplied from the oil pick-up 24 around the piston via internal oil passages 25 to locations requiring lubrication, for example the interface between the first roller 18 and the piston head 7 and stabilizing element 15 and the interface between the second roller 20 and the stabilizing element 15 and cap element 16.

Figure 9B:
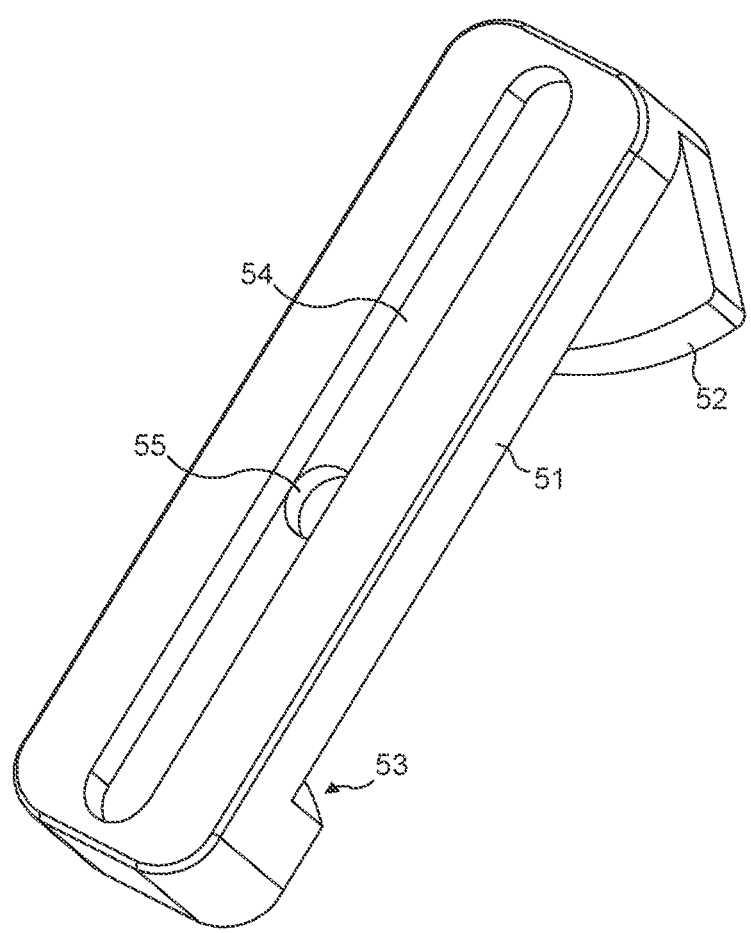

Oil is delivered to the edge surfaces 14a, 14b by an oil delivery device 50 shown in FIGS. 9A and 9B. The oil delivery device 50 comprises an elongate main body portion 51 which is slidably received in a recess 60 formed in the locating element 33, the main body 51 having a working surface facing away from the locating element 33 and a pair of cam followers 52, 53 extending from the working surface at either end of the body portion. The first cam follower 52 has a bearing surface with a radius of curvature substantially equal to the radius of the first roller 18 and bears against the outer cam surface 12a of the first track portion 11a. The second cam follower 53 has a bearing surface with a radius of curvature substantially equal to the radius of the second roller 20 and bears against the inner cam surface 13a of the first track portion 11a. The working surface of the oil delivery device lies adjacent the edge surface 14a of the first track portion 11a. As the track rotates within the engine, the followers 52, 53 move the oil delivery device within the recess 60 in accordance with the path shape of the track such that the working surface remains adjacent the edge surface of the track. A second oil delivery device (not shown) is provided in a similar slot 62 formed in the other locating element 32.

Oil is delivered under pressure by a pump (not shown) into the recess 60 via an internal passage extending through the locating element 33 and having an outlet in the recess. (The outlet of the internal passage is obscured by the main body 51 of the oil delivery device 50 but the outlet opening into a similar recess for receiving a similar oil delivery device in the other locating element 32 is visible in FIG. 9A.) The oil is received and collected in a chamber 54 formed in the reverse face of the main body 51 (shown in FIG. 9B), then supplied to the edge surface 14a of the first track portion 11a through a hole 55 extending through the main body 51 from the chamber 54 to the working surface. The chamber is sufficiently long that the outlet discharges oil directly into the chamber 54 throughout the full range of motion of the oil delivery device as it is moved by the track 11a. The working surface acts to limit the height of the oil film formed on the edge surface 14a, and can act as a wiper to remove excess oil. Therefore the oil delivery device 50 allows oil to be continuously supplied in a controlled manner to the edge surface 14a of the track portion 11a shortly upstream of the stabilizing element such that the edge surface is well lubricated as it moves past the stabilizing element. The second oil delivery device lubricates the edge surface 14a of the track portion 11a shortly upstream of the stabilizing element of the piston assembly 5B located on the opposite side of the track 11a, 11b. Additional oil delivery devices (not shown) are mounted on the opposite faces of the locating elements 32, 33 to lubricate the edge surface 14b of the second track portion 11b.

As can be seen in FIG. 5A, the central axis of the piston does not pass through the axis of rotation of the track 11a, 11b but instead the axis of rotation of the track is offset from the piston axis by an angle α4. The angle α4 is approximately 15 degrees when taken from the rotational axis of the first roller 18 when the piston is in the center of its stroke. Therefore the piston head 7 does not follow pure radial motion with respect to the track 11a, 11b. By offsetting the piston from the track in this manner the efficiency with which power is transferred from the piston to the track and/or vice versa may be maximised. The geometry of the track can also be optimised while avoiding fouling of the piston on the track.

In operation of the engine, the first roller 18 bears against and rolls along the outer cam surfaces 12a, 12b of the track 11a, 11b and the second roller 20 bears against and rolls along the inner cam surfaces 13a, 13b of the track 11a, 11b. As the track 11a 11b rotates within the engine 1, the piston head 7 moves within its cylinder sleeve 8 in accordance with the path shape of the track. During some portions of the operating cycle the piston is driven by the track, for example during intake, compression and exhaust strokes. During some portions of the operating cycle the track is driven by the piston such that work can be extracted from the output shaft 9, for example during power strokes. Since the path shape of the track may be given any desired shape, the piston is not constrained to following simple harmonic motion as in most conventional internal combustion engines but can instead have any desired displacement profile. The displacement profile may, for example, include multiple different local top dead center positions at different heights and/or multiple different bottom dead center positions at different heights. As can be seen from FIG. 3, the track 11a, 11b is shaped such that the piston completes 6 strokes for every output shaft revolution (including a steam cycle in addition to intake, compression, power and exhaust strokes) and experiences different top dead center positions and different bottom dead center positions at different heights.

As can be seen from FIG. 4, the second piston arrangement 5b comprises a piston coupled to the same track 11a, 11b as the first piston arrangement 5a by a similar bearing arrangement. The pistons of the first and second piston arrangements 5a, 5b are operated 180 degrees out of phase with each other. The third and fourth piston arrangements 5c, 5d respectively comprise pistons coupled to a similar track comprising two track portions 11c, 11d which are non-rotatably mounted to the output shaft 9. The timings of the piston arrangements 5a, 5b, 5c, 5d are set to substantially cancel engine vibration. In alternative embodiments an engine may comprise any number of tracks (for example 1, 2, 3 or more) and may have any number of piston arrangements (for example 1, 2, 3 or more) operated by each track.

Figure 10A:
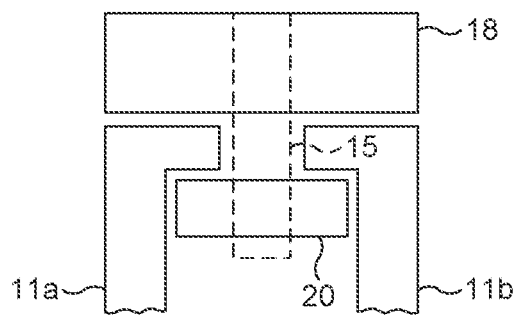
FIGS. 10A to 10D show various alternative bearing arrangements.
Figure 10B:
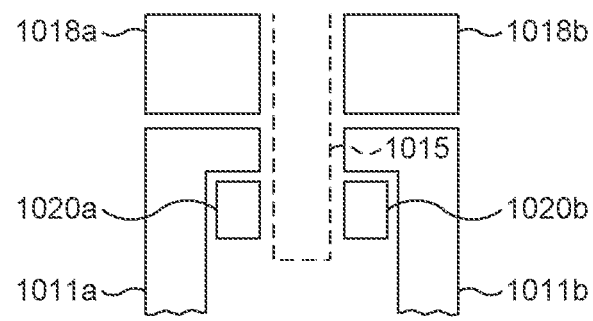
Figure 10C:
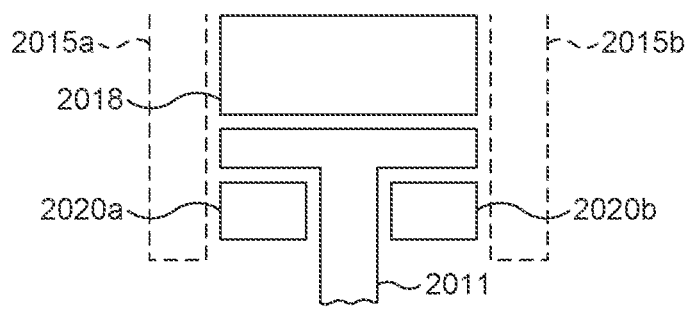
Figure 10D:
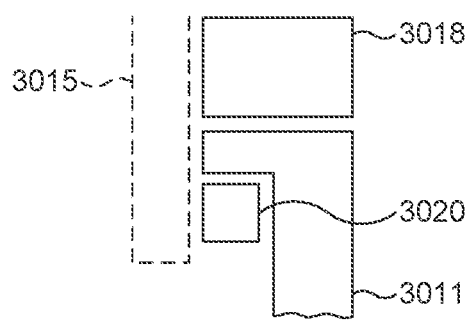

In the embodiment described above the track comprises first and second track portions 11a, 11b each providing an upper cam surface and a lower cam surface. The piston has a first roller 18 which engages the upper surfaces of both track portions, a second roller 20 which engages the lower surfaces of both track portions, and a stabilizing element extending between the first and second track portions (see FIG. 10A). However, the skilled person will appreciate that other track/roller arrangements are possible, such as those shown in FIGS. 10B to 10D. For example, the first and second rollers may each be replaced by two separate rollers such that first and second rollers 1018a, 1020a respectively engage the upper and lower surfaces of a first track portion 1011a and third and fourth rollers 1018b, 1020b respectively engage the upper and lower surfaces of a second track portion 1011b, a stabilizing element 1015 extending between the first and second track portions (see FIG. 10B). The rollers 1018a, 1018b, 1020a, 1020b may each extend into the body of the piston head and/or into the body of the stabilizing element, or alternatively may each be located outside the body of the piston head and/or into the body of the stabilizing element but be constrained between a curved bearing surface and the track. In an alternative example a first roller 2018 extends between two parallel stabilizing portions 2015A, 2015B and engages an upper surface of a single track portion 2011 while a further pair of rollers 2020a, 2020b engages a corresponding pair of lower cam surfaces provided on the same track portion (FIG. 10C). In another alternative example only a single track portion 3011 may be provided on a single side of a stabilizing element 3015 with first and second rollers 3018, 3020 respectively engaging upper and lower cam surfaces of the track 3011 (see FIG. 10D). In this case a locating element may engage the side of the stabilizing element facing away from the track 3011 to stabilize the piston.

Figure 11:
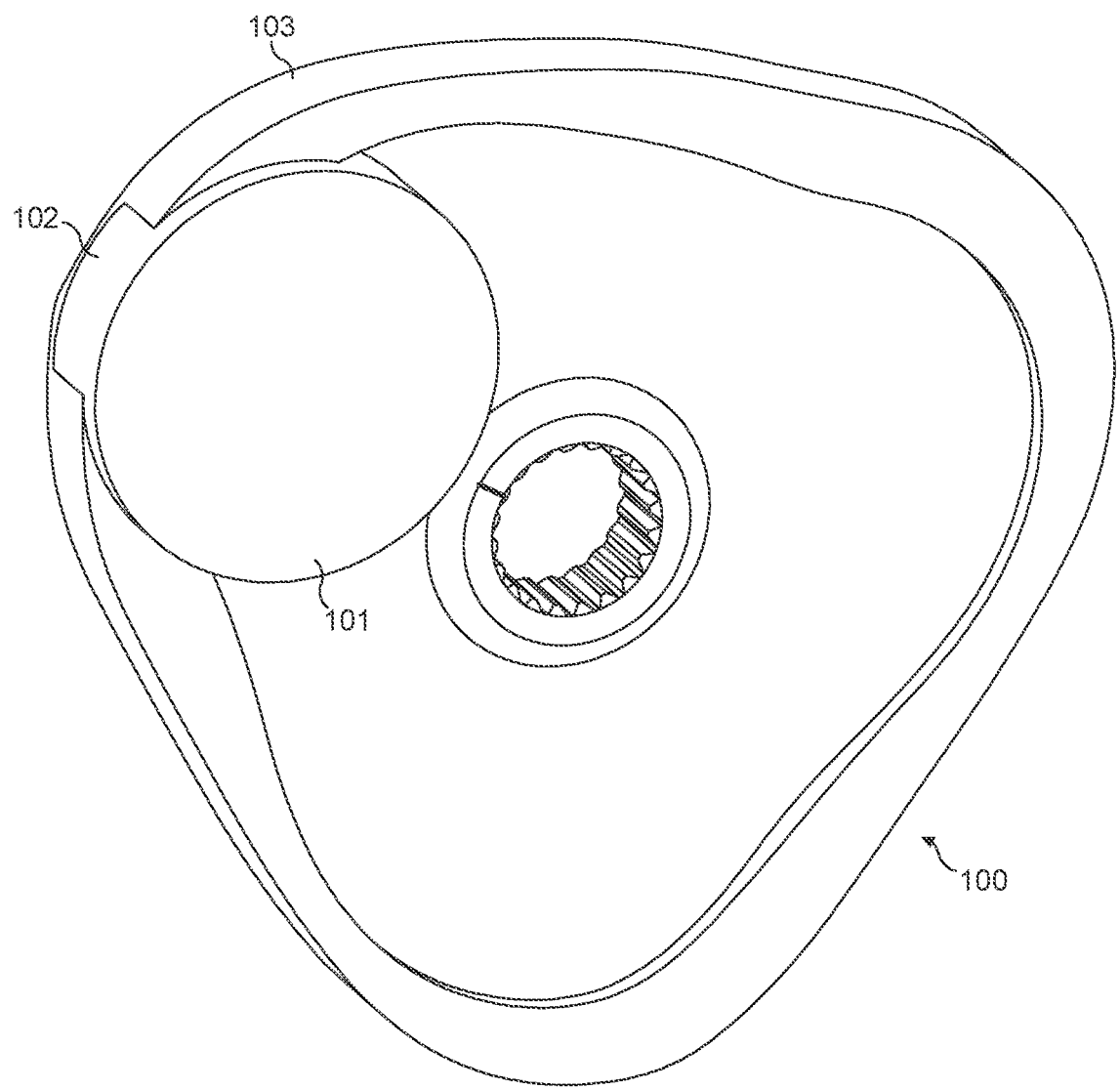
FIG. 11 shows an alternative track which may be used in the engine.

In the embodiments described above the track comprises rigid track sections providing continuous annular cam surfaces. In an alternative embodiment the track may include at least one moving part which forms a part of the cam surface and which moves with respect to the rest of the track. For example, FIG. 11 illustrates a track 100 having a bearing or roller 101 attached thereto, the roller having an outer radial surface 102 which forms a part of the cam surface 103 of the track. The roller 101 is located at a local maximum of the track which corresponds to a top dead center position of a piston operated by the track 100, the piston having a follower which runs along the cam surface 103. As the follower moves over the outer radial surface 102 of the roller 101, the roller 101 rotates in the direction of movement of the piston with respect to the track to prevent or reduce slip between the follower and the cam surface 103. The roller 101 may be able to rotate through 360 degrees or may alternatively be constrained to a smaller angle of rotation. The roller may be passively driven by motion of the follower over the roller or alternatively may be actively driven, for example by a motor.

Figure 12:
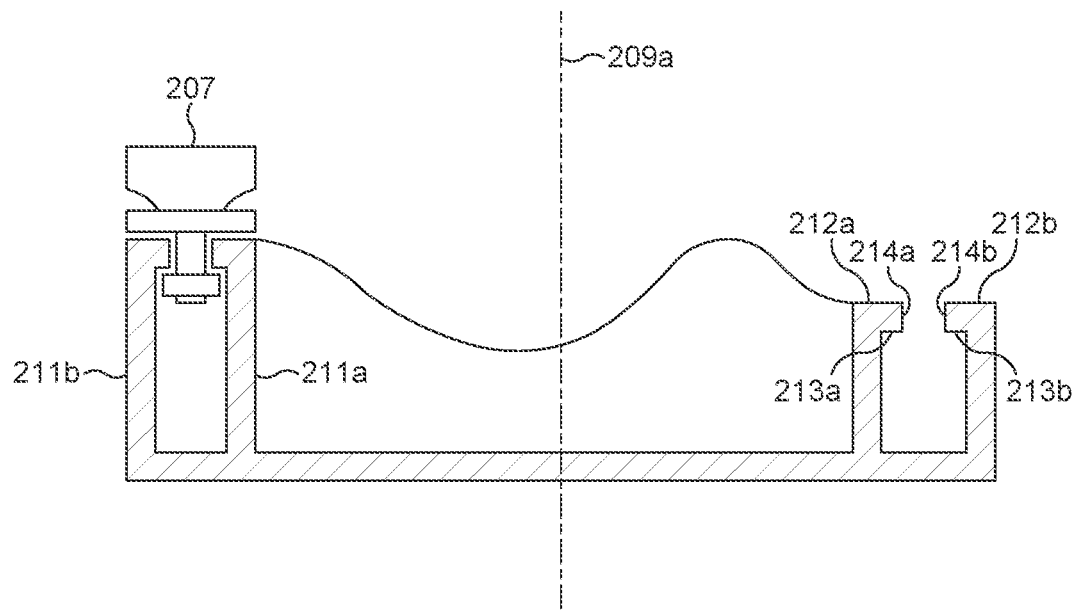
FIGS. 12, 13A, 13B, and 14 show an alternative track lay-out.
Figure 13A:
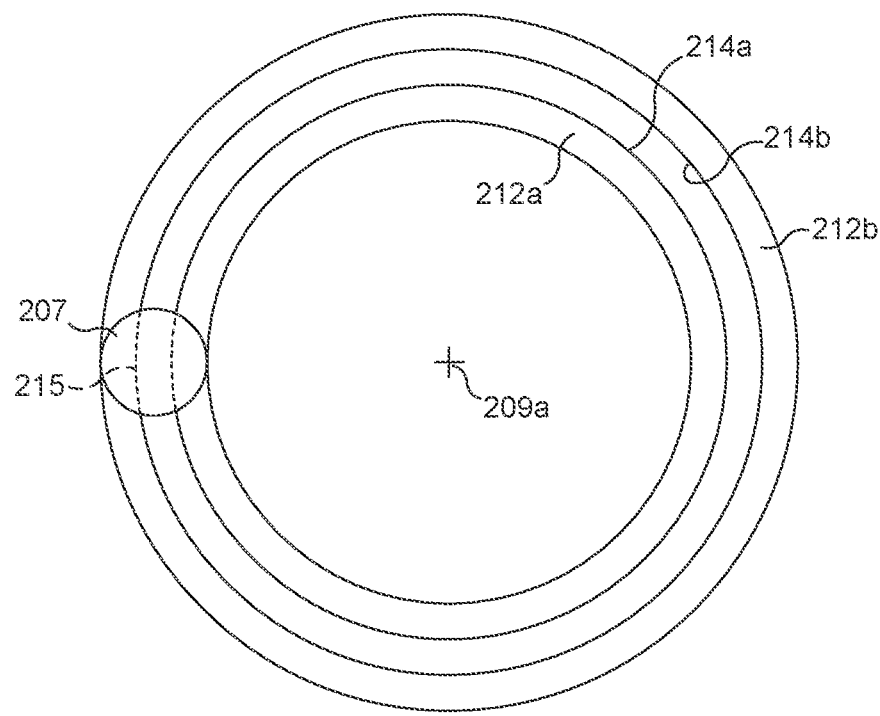
Figure 13B:
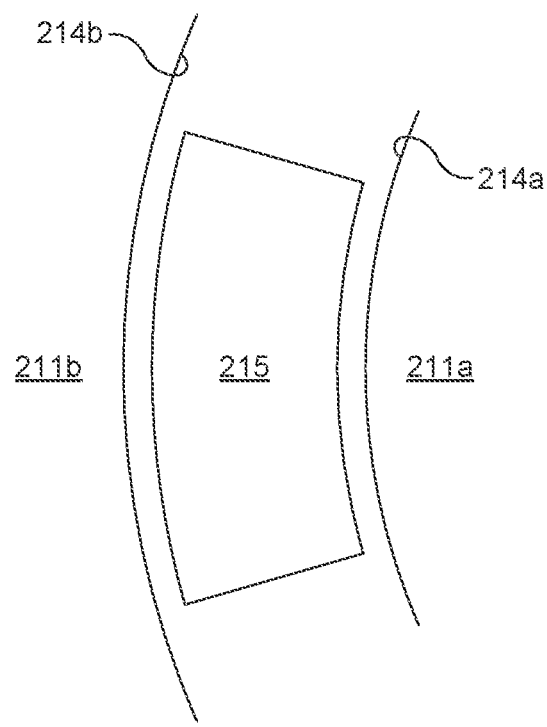

In the embodiments described above the track is a radial track which controls motion of the piston via inner and outer radial surfaces. In an alternative embodiment a piston 207 may be coupled to an annular track 211a, 211b with cam surfaces 212a, 212b, 213A, 213B facing in a direction parallel to the axis of rotation 209A of the track, for example as shown in FIG. 12. FIG. 12 shows an annular track comprising first and second track portions 211a, 211b each having an edge surface 214a, 214b engaging opposite sides of a stabilizing element of the piston 207. The track portions 211a, 211b are arranged concentrically such that an annular gap is formed between the edge surfaces 214a, 214b of the inner and outer track portions, as shown in FIG. 13A taken from the direction of the axis of rotation 209A. The stabilizing element 215 of the piston 207 has a curved shape when viewed from a direction parallel to the axis of rotation of the track corresponding to the shape of the annular gap formed between the edge surfaces 214a, 214b, as shown in FIG. 13B (in which the radius of curvature and thickness of the stabilizing element have been exaggerated for illustrative purposes).

Figure 14:
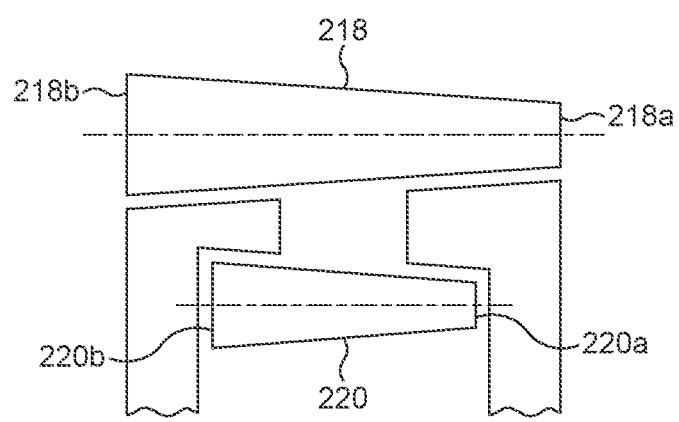

The central axis of the piston may be offset from the axis of rotation of the track (for example if the axis of rotation of the track lies in the plane of the page in FIG. 12 then the central axis of the piston is angled out of the page) for example to allow the efficiency of power transfer from the piston to the track and vice-versa to be maximised.

Where the track is annular, the surface of the rollers 218, 220 may each have a tapered shape such that their inner-most end 218a, 220a with respect to the axis of rotation of the track has a smaller diameter than the outer-most end 218a, 220a, as illustrated in FIG. 14. The outer-most end of the roller therefore has a greater circumference and will roll over a longer distance for each revolution of the roller compared to the inner-most end. In this way the tapered rollers may account for the difference in path length between the radially inner-most part of the track and the radially outer-most part of the cam surfaces of the track.

In the embodiments described above the stabilizing element is attached directly to the piston head and the first roller bears against the underside of the piston head. In alternative embodiments the stabilizing element may be connected to the piston head via an intermediate component such as a con-rod, which may be rigidly attached to the piston head and to the stabilizing element or alternatively pivotally attached to the piston head and to the stabilizing element.

Figure 15B:
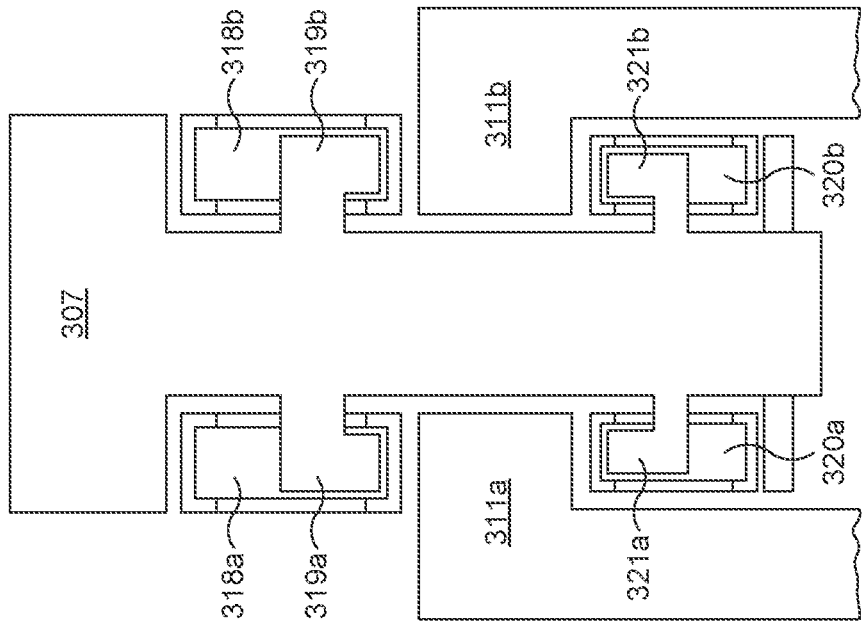
FIGS. 15A and 15B show an alternative bearing arrangement.
Figure 15A:
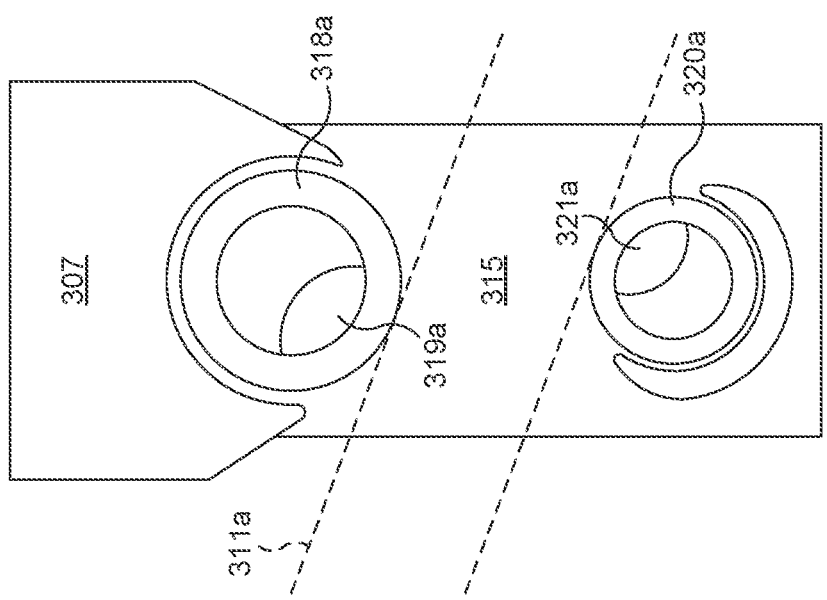

In the embodiments described above the roller is mounted to the piston on a curved bearing surface which engages the outer radial surface of the roller and extends a portion of the distance around its outer circumference. Additionally (or alternatively) in other embodiments a roller 318a may be mounted to a piston 307 on a curved bearing surface which engages an inner radial surface of the roller, for example as shown in FIG. 15A. In an alternative embodiment shown in FIGS. 15A and 15B a first roller 318a is mounted to the piston 307 via a curved bearing surface provided on a shoe 319A which extends outwardly from a stabilizing element 315 of the piston into the hollow center of the roller 318a and engages the radial inner surface of the roller. The first roller 318a is also mounted on the piston 307 via a curved bearing surface provided on the underside of the piston head which engages the radial outer surface of the roller. The roller 318a transfers load between the piston 307 and a track portion 311a via both curved bearing surfaces. As can be seen from FIG. 15A, the shoe 319A is offset to one side of the piston 307 so that the center of the contact patch between the roller and the shoe is aligned with the direction of maximum loading. The roller 318a has radially inwardly extending flanges located on opposite sides of the shoe 319A for retaining the roller axially on the shoe, as shown in FIG. 15B. The shoe may deliver oil to the inner radial surface of the roller from an oil pick-up located on the contact surface of the stabilizing element. A similar roller arrangement is provided on the opposite side of the stabilizing element with roller 318b mounted on a shoe 319B and running on a track portion 311b. Similar roller arrangements 320a/321a and 320b/321b are also provided on the opposite side of the track to move the piston 307 in the opposite direction. In other embodiments the rollers may engage the piston via their radial inner surfaces only so that the roller is mounted on the shoe only and transfers load between the piston and the track only via the shoe.

Figure 16A:
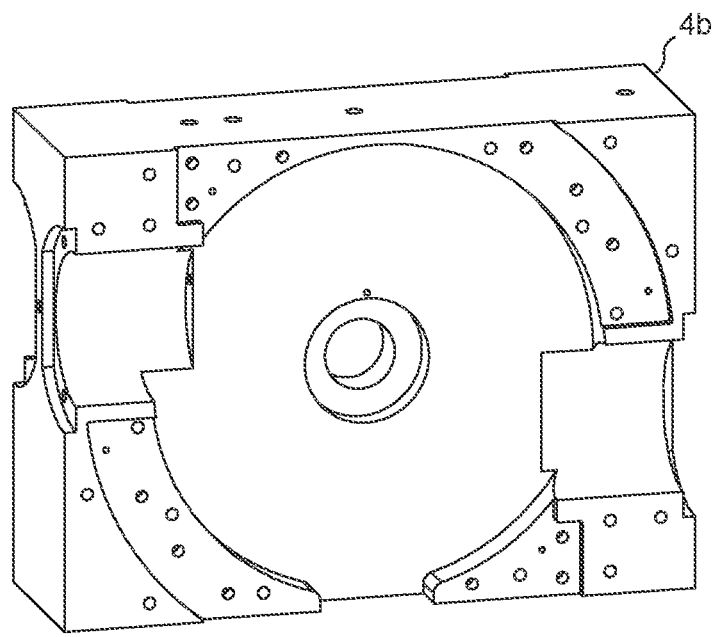
FIGS. 16A to 16J show the engine at various stages during assembly.
Figure 16B:
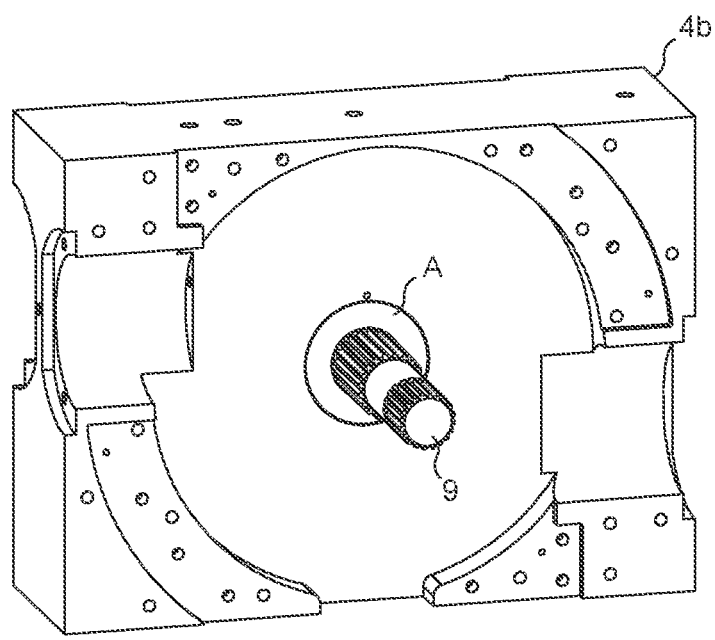
Figure 16C:
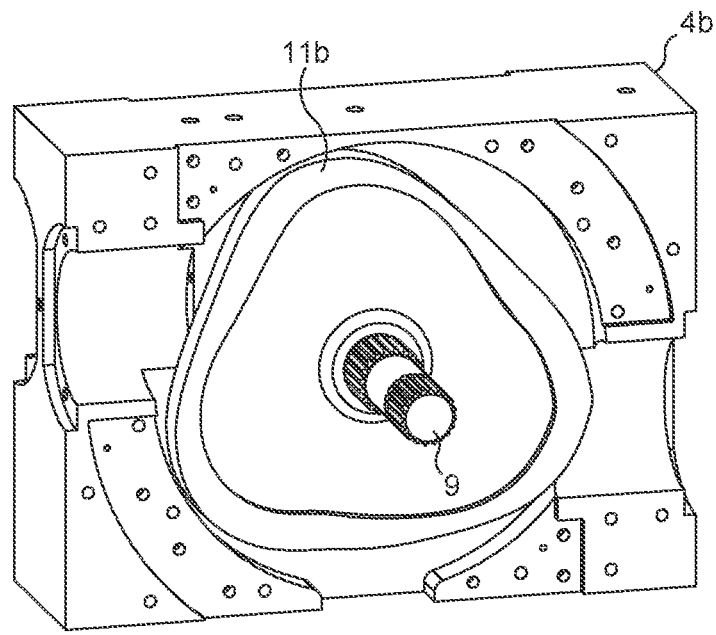
Figure 16D:
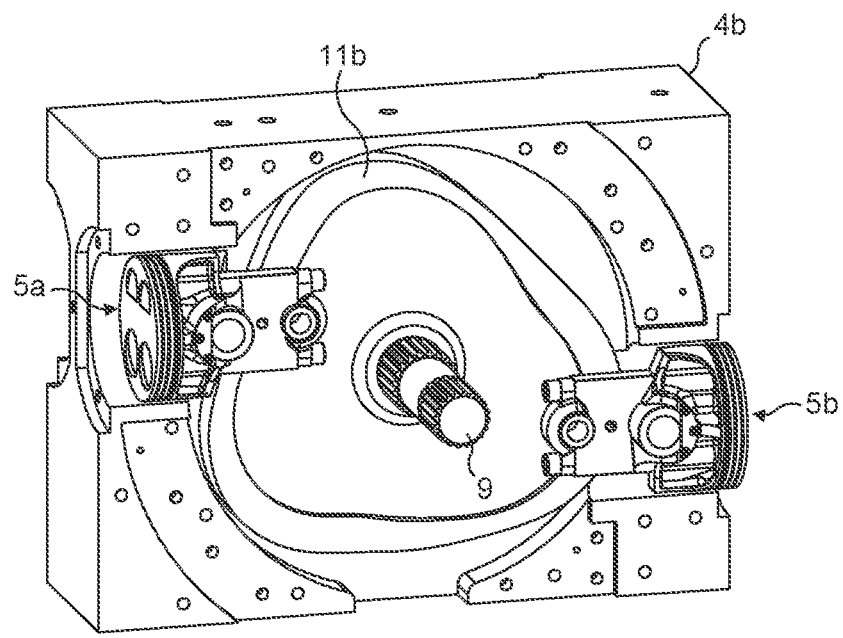
Figure 16E:
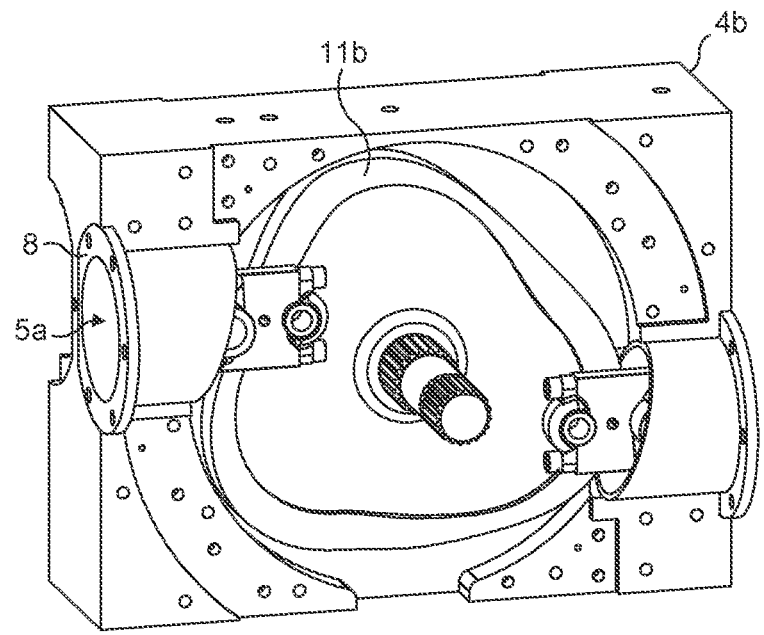
Figure 16F:
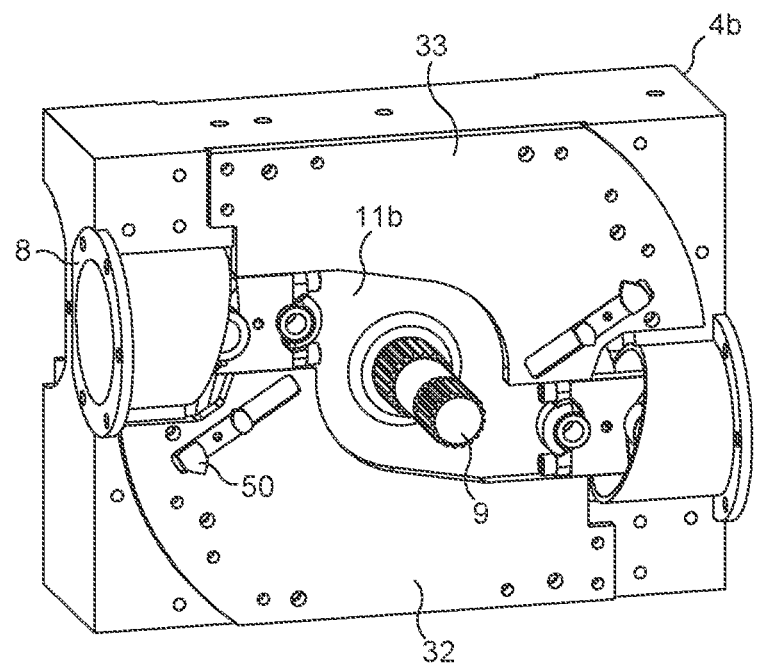
Figure 16G:
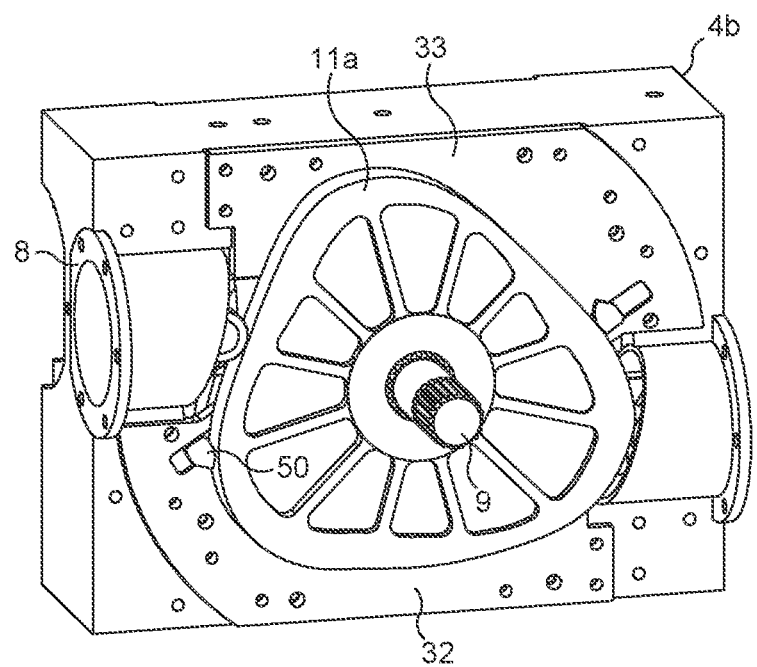
Figure 16H:
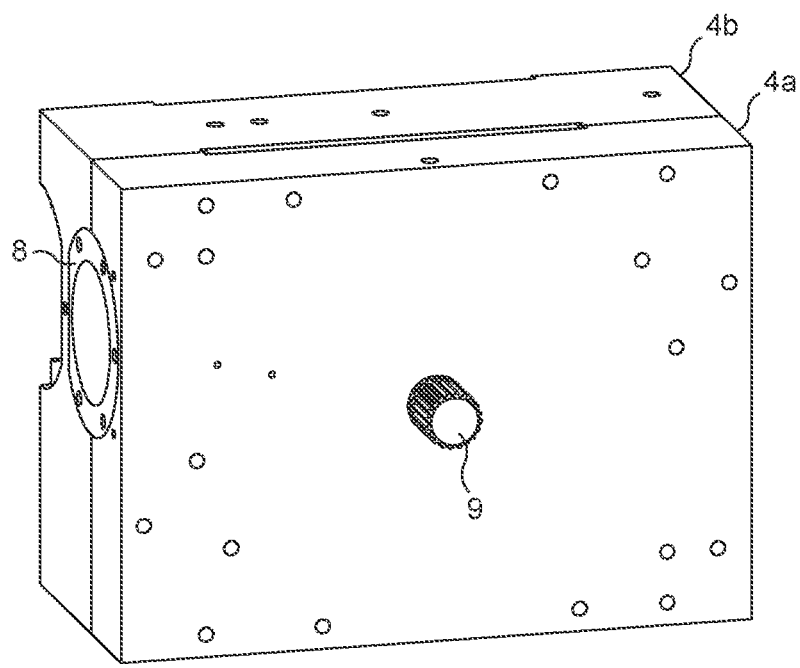
Figure 16I:
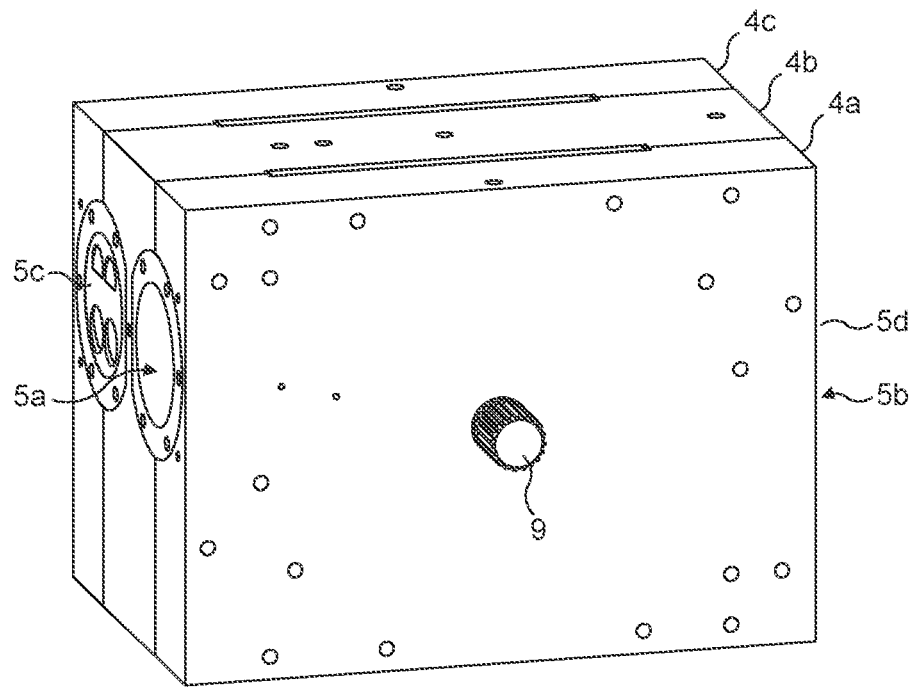
Figure 16J:
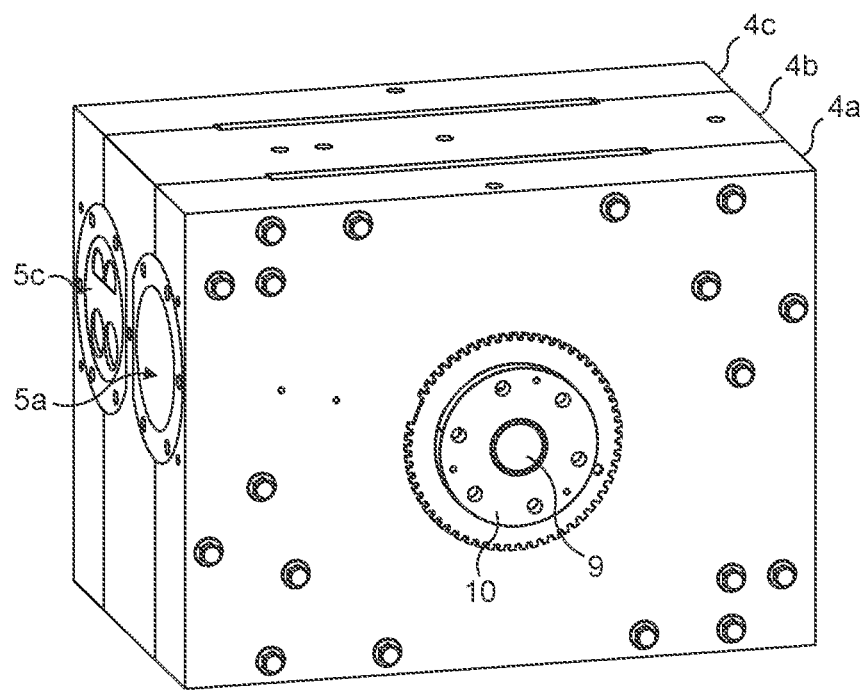

The engine is assembled by the following steps. The method recited below does not include all steps required to assemble all of the components forming part of the engine but has instead been reduced to the major steps for assembling the power transfer mechanism and casing for clarity:

a) Press bearing A into a recess formed in casing element 4b and insert shaft 9 through a hole formed through casing element 4b (FIGS. 16A and 16B).

b) Feed track portion 11b over shaft 9 and bring it into engagement with bearing A (FIG. 16C).

c) Couple the piston 80 to the track portion 11b by engaging the outer surface 12b with the upper roller 18 and the inner surface 13b with the lower roller 20 and feed cylinder sleeve 8 over the piston head (FIGS. 16D and 16E). Similarly couple the opposed piston of the second piston arrangement to the track portion 11b.

d) Attach the locating elements 32, 33 to the casing element 4b (FIG. 16F), with oil delivery devices located in their respective slots (one on each side of each stabilizing element).

e) Feed a spacer element S (visible adjacent the track portion 11b in FIG. 6B) over shaft 9 and then feed track portion 11a over the shaft and bring it into engagement with the spacer element (FIG. 16G).

f) Press bearing B (visible below the track portion 12a in FIG. 4) into casing element 4c and then feed casing element 4c over shaft 9 to bring the bearing B into engagement with the track portion 11a (FIG. 16H).

g) Perform equivalent steps to couple the piston arrangements 5c and 5d to shaft 9 and bring casing element 4a into place (FIG. 16I).

h) Attach casing elements 4a, 4b and 4c together with fasteners extending through the casing (FIG. 16J).

The casing element 4b which lies between the tracks 11a, 11b and 1c, 11d is brought into place around the shaft 9 before both of the tracks and their respective pistons have been coupled to the shaft. The casing elements 4b and 4c are brought together after the piston assemblies 5a and 5b have been coupled to the shaft 9, and the casing elements 4a and 4b are brought together after the piston assemblies 5c and 5d have been coupled to the shaft 9.

Although the invention has been described above with reference to one or more preferred embodiments, it will be appreciated that various changes or modifications may be made without departing from the scope of the invention as defined in the appended claims.

The present disclosure may include one or more of the following concepts:

A. A piston arrangement including a track and a piston moveable within a cylinder; wherein the track is adapted to rotate relative to the cylinder about an axis of rotation and has a cam surface and an edge surface extending away from the cam surface; wherein the piston is coupled to the track by a follower running on the cam surface; wherein the cam surface is shaped such that, as the track moves relative to the cylinder, the piston head moves in reciprocating motion within the cylinder in accordance with the path of the cam surface; wherein a stabilizing element is connected to the piston, the stabilizing element extending below the piston head and comprising a contact surface which engages the edge surface of the track.

B. A piston arrangement in accordance with paragraph A, wherein the track rotates about the axis of rotation while the cylinder remains stationary with respect to the axis of rotation.

C. A piston arrangement in accordance with paragraphs A or B, wherein the stabilizing element is rigidly attached to the piston head by one or more fasteners.

D. A piston arrangement in accordance with any of the previous paragraphs, wherein the shape of the contact surface of the stabilizing element substantially corresponds to the shape of the edge surface of the track.

E. A piston arrangement in accordance with any of the previous paragraphs, wherein the stabilizing element comprises first and second end surfaces, the contact surface extending between the first and second end surfaces, wherein at least one of the first and second end surfaces slidingly engages a locating element as the piston moves in reciprocating motion.

F. A piston arrangement in accordance with any of the previous paragraphs, wherein the follower comprises a roller mounted to the piston, the roller being adapted to rotate relative to the piston as it runs along the track.

G. A piston arrangement in accordance with any of the previous paragraphs, wherein the track comprises first and second cam surfaces facing away from each other in opposite directions, the edge surface extending between the first and second cam surfaces; wherein the piston comprises first and second followers respectively running on the first and second cam surfaces.

H. A piston arrangement in accordance with any of the previous paragraphs, wherein the track comprises first and second track portions located on opposite sides of the stabilizing element, wherein the first track portion comprises an edge surface extending away from at least one cam surface and the second track portion comprises an edge surface extending away from at least one cam surface and facing towards the edge surface of the first track portion, wherein the stabilizing element comprises first and second contact surfaces which engage the respective edge surfaces of the first and second track portions.

I. A piston arrangement in accordance with any of the previous paragraphs, wherein the stabilizing element has a thickness which tapers across the extent of the stabilizing element in a direction parallel to the direction of relative movement between the piston and the track.

J. A piston arrangement in accordance with any of the previous paragraphs, wherein the track is a radial track with the cam surface(s) arranged as inner radial and/or outer radial surfaces with respect to the axis of rotation.

K. A piston arrangement in accordance with paragraph J when dependent on paragraph H, wherein the edge surface of the first track portion is substantially parallel to the edge surface of the second track portion.

L. A piston arrangement in accordance with paragraph K, wherein the stabilizing element is substantially straight when viewed from a direction parallel to the axis of the piston.

M. A piston arrangement according to any of paragraphs A to I, wherein the track is an annular track with the cam surface(s) arranged facing in a direction parallel to the axis of rotation.

N. A piston arrangement in accordance with paragraph M when dependent on paragraph H, wherein the first and second track portions are arranged concentrically such that an annular gap is formed between the edge surfaces of the first and second track portions.

O. A piston arrangement in accordance with paragraph N, wherein the stabilizing element is located within the annular gap and has a curved shape when viewed from a direction parallel to the axis of rotation, the curved shape having a radius substantially corresponding to that of the annular gap.

P. A piston arrangement in accordance with any of the previous paragraphs, wherein the edge surface is lubricated such that the contact surface of the stabilizing element contacts the edge surface of the track via a layer of lubricant.

Q. A piston arrangement in accordance with paragraph P, wherein the contact surface of the stabilizing element comprises an oil pick-up adapted to receive oil from the edge surface of the track.

R. A piston arrangement in accordance with paragraphs P or Q, wherein the edge surface is lubricated by a lubricant delivery device; wherein the lubricant delivery device comprises a body portion including a lubricant delivery port through which lubricant is supplied to the edge surface; wherein the lubricant delivery device further comprises at least one follower which couples the lubricant delivery device to the track such that, as the track moves relative to the cylinder, the lubricant delivery device moves in reciprocating motion in accordance with the path of the track thereby maintaining the lubricant supply to the edge surface.

S. An internal combustion engine comprising at least one piston arrangement in accordance with any of the previous paragraphs.

T. A piston arrangement including a piston moveable within a cylinder and a track having a cam surface which is adapted to move relative to the cylinder; wherein the piston is coupled to the track by a bearing which runs on the cam surface; wherein the bearing has a roller and a curved bearing surface on which the roller is rotatably mounted such that the roller is held captive between the cam surface and the bearing surface; wherein the bearing surface engages the roller via a contact patch which extends only a portion of the distance around the circumference of the roller.

U. A piston arrangement in accordance with paragraph T, wherein the curved bearing surfaces engages an inner radial surface of the roller.

V. A piston arrangement in accordance with paragraph U, wherein the curved bearing surface is provided on a shoe which extends into a hollow center of the roller.

W. A piston arrangement in accordance with paragraph V, wherein the shoe comprises a lubricant outlet and/or a lubricant pick-up for supplying a lubricant to the inner radial surface of the roller and/or removing lubricant from the inner radial surface of the roller.

X. A piston arrangement in accordance with paragraphs V or W, wherein the roller has a radially inwardly extending flange located to the side of the shoe.

Y. A piston arrangement according to any of paragraphs U to X, wherein the contact patch between the curved bearing surface and the inner radial surface of the roller extends through an angle of less than 180 degrees.

Z. A piston arrangement according to any of paragraphs U to Y, wherein the contact patch between the curved bearing surface and the inner radial surface of the roller is offset to one side of a plane passing through the central axis of rotation of the roller and aligned with the direction of movement of the piston within the cylinder.

AA. A piston arrangement according to any of paragraphs T to Z, wherein the curved bearing surface engages an outer radial surface of the roller.

BB. A piston arrangement in accordance with paragraph AA, wherein the piston has a head with a working face; wherein the curved bearing surface is provided on a reverse side of the piston head.

CC. A piston arrangement in accordance with paragraphs AA or BB, wherein the curved bearing surface engaging the outer radial surface of the roller comprises a lubricant outlet and/or a lubricant pick-up.

DD. A piston arrangement according to any of paragraphs AA to CC, wherein the roller has an axial end face; wherein a retaining component is removably attached to the piston, the retaining component being located at the axial end face of the roller to prevent the roller from moving with respect to the piston in a direction aligned with its rotational axis beyond the retaining component.

EE. A piston arrangement according to any of paragraphs AA to DD, wherein the contact patch between the curved bearing surface and the outer radial surface of the roller extends through an angle of between 120 degrees and 330 degrees.

FF. A piston arrangement according to any of paragraphs AA to EE, wherein the contact patch between the curved bearing surface and the outer radial surface of the roller is offset to one side of a plane passing through the central axis of rotation of the roller and aligned with the direction of movement of the piston within the cylinder.

GG. A piston arrangement according to any of paragraphs T to FF, wherein the cam surface is shaped such that, as the track moves relative to the cylinder, the piston head moves in reciprocating motion within the cylinder in accordance with the path of the cam surface.

HH. A piston arrangement according to any of paragraphs T to GG, wherein at least a portion of the cam surface is provided with a coating or surface treatment.

II. A piston arrangement according to any of paragraphs T to HH, wherein the track forms a continuous loop and rotates relative to the cylinder about an axis of rotation, and wherein the cam surface forms a continuous surface extending around the loop.

JJ. A piston arrangement according to any of paragraphs T to II, wherein the cylinder remains fixed while the track moves relative to the cylinder.

KK. A piston arrangement according to any of paragraphs T to JJ, wherein the roller comprises a protrusion extending beyond its outer radial surface around its circumference which engages the track to prevent the roller from moving relative to the piston in a direction aligned with the rotational axis of the roller and/or wherein the track comprises a protrusion extending beyond the cam surface around its circumference which engages the roller to prevent the roller from moving relative to the piston in a direction aligned with the rotational axis of the roller a recess or chamfer or protrusion in its outer radial surface extending around its circumference; wherein the track comprises a corresponding protrusion or recess or chamfer which engages the recess or chamfer or protrusion of the roller to prevent to roller from moving relative to the piston in a direction aligned with its rotational axis.

LL. A piston arrangement according to any of paragraphs T to KK, wherein the contact patch is part cylindrical.

MM. A piston arrangement according to any of paragraphs T to LL, wherein the track further comprises a second cam surface facing in the opposite direction to the first cam surface; wherein the piston arrangement further comprises a second bearing having a roller and a curved bearing surface on which the roller is rotatably mounted such that the roller is held captive between the second cam surface and the bearing surface; wherein the bearing surface engages the roller via a contact patch which extends only a portion of the distance around the circumference of the roller.

NN. A piston arrangement according to any of paragraphs T to MM, wherein the track comprises first and second track portions located on opposite sides of the piston, each track portion providing a respective cam surface.

OO. A piston arrangement according to any of paragraphs T to NN, wherein the track is a radial track with the cam surface arranged as inner radial or outer radial surface with respect to an axis of rotation of the track relative to the cylinder.

PP. A piston arrangement in accordance with paragraph OO, wherein the cylinder has a central axis, wherein the cylinder axis does not pass through the axis of rotation of the track relative to the cylinder.

QQ. A piston arrangement according to any of paragraphs T to NN, wherein the track is an annular track with the cam surface arranged facing in a direction parallel to an axis of rotation of the track relative to the cylinder.

RR. A piston arrangement in accordance with paragraph QQ, wherein the cylinder has a central axis, wherein the cylinder axis is not parallel to the axis of rotation of the track relative to the cylinder.

SS. A piston arrangement in accordance with paragraphs QQ or RR, wherein the roller comprises a tapered shape such that its diameter at a radially inner-most edge of the cam surface is smaller than its diameter at a radially outer-most edge of the cam surface.

TT. An internal combustion engine comprising a piston operated by a bearing arrangement according to any of paragraphs T to SS.

UU. A piston arrangement including a piston moveable within a cylinder and a track having a cam surface which is adapted to move relative to the cylinder; wherein the piston is coupled to the track by a bearing which runs on the cam surface; wherein the bearing comprises a roller and a curved bearing surface; wherein the roller has a radial outer surface which runs on the cam surface; wherein the curved bearing surface engages an outer redial surface of the roller such that the roller is held captive between the bearing surface and the cam surface; wherein the bearing surface engages the roller via a contact patch which extends only a portion of the distance around the circumference of the roller such that a portion of the radial outer surface of the roller is exposed so that it can run on the cam surface.

VV. An internal combustion engine comprising a piston arrangement including a piston coupled to a track; wherein the track is coupled to a shaft and has a cam surface, and the piston has a follower which runs on the cam surface of the track to control motion of the piston; the engine further comprising a casing including first and second casing elements, wherein the first casing element meets the second casing element at an interface and the first piston moves in reciprocating motion within a bore which passes through the interface between the first and second casing elements.

WW. An internal combustion engine in accordance with paragraph VV; wherein the track has first and second cam surfaces facing in opposite directions and the piston has first and second followers which respectively run on the first and second cam surfaces of its respective track; wherein the piston is coupled to its respective track by engaging the first cam surface with the first follower and engaging the second cam surface with the second follower.

XX. An internal combustion engine in accordance with paragraphs VV or WW; wherein the track comprises first and second track portions, each track portion having a cam surface; wherein the piston is coupled to the track via the cam surfaces of the first and second track portions.

YY. An internal combustion engine in accordance with paragraph XX; wherein a plate-like locating element is provided between the first and second track portions, the locating element acting to stabilize the piston and prevent movement of the piston between the first and second track portions.

ZZ. An internal combustion engine according to any of paragraphs VV to YY; wherein the interface between the first and second casing elements is substantially planar.

AAA. An internal combustion engine according to any of paragraphs VV to ZZ, further comprising a second piston coupled to a second track; wherein the second track is coupled to the shaft and has a cam surface, and the second piston has a follower which runs on the cam surface of the second track to control motion of the second piston; the casing further including a third casing element, wherein the second casing element meets the third casing element at an interface and the second piston moves in reciprocating motion within a bore which passes through the interface between the second and third casing elements.

BBB. An internal combustion engine according to any of paragraphs VV to AAA; wherein each casing element surrounds the shaft.

CCC. An internal combustion engine according to any of paragraphs VV to BBB; wherein the casing elements are attached together by a plurality of fasteners passing through each of the casing elements.

DDD. A method of assembling an internal combustion engine comprising a piston arrangement including a piston coupled to a track; wherein the track is coupled to a shaft and has a cam surface, and the piston has a follower which runs on the cam surface of the track to control motion of the piston; the engine further comprising a casing including first and second casing elements, wherein the first casing element meets the second casing element at an interface and the first piston moves in reciprocating motion within a bore which passes through the interface between the first and second casing elements; the method including the steps of: a) coupling the first piston arrangement to the shaft by coupling the first track to the shaft and coupling the first piston to the first track; b) bringing the first and second casing elements together around the first piston after the first piston arrangement has been coupled to the shaft; and c) coupling the first and second casing elements together using one or more fasteners.

EEE. A method in accordance with paragraph DDD, wherein the internal combustion engine further comprises a second piston coupled to a second track; wherein the second track is coupled to the shaft and has a cam surface, and the second piston has a follower which runs on the cam surface of the second track to control motion of the second piston; the casing further including a third casing element, wherein the second casing element meets the third casing element at an interface and the second piston moves in reciprocating motion within a bore which passes through the interface between the second and third casing elements; the method including the steps of: d) coupling the second piston arrangement to the shaft by coupling the second track to the shaft and coupling the second piston to the second track; e) bringing the second and third casing elements together around the second piston after the second piston arrangement has been coupled to the shaft; and f) coupling the first and second casing elements together and coupling the second and third casing elements together using one or more fasteners; wherein the second casing element is positioned between the first and second pistons before the first and second piston arrangements have both been coupled to the shaft.

What is claimed is:

1. A piston assembly comprising:
a track;
a first piston movable within a first cylinder, the first piston having a piston head and a piston axis; and
a second piston movable within a second cylinder, the second piston having a piston head and a piston axis;
wherein the track is rotatable relative to each cylinder about an axis of rotation extending perpendicular to each piston axis and the track has a cam surface and an edge surface extending away from the cam surface;
wherein the first piston is coupled to the track by a first follower running on the cam surface and the second piston is coupled to the track by a second follower running on the cam surface;
wherein the cam surface is shaped such that, as the track moves relative to each cylinder, each piston head moves in reciprocating motion within the cylinder along each piston axis in accordance with a path of the cam surface;
wherein a stabilizing element is connected to each piston, the stabilizing element extending below each piston head and including a contact surface engaging the edge surface of the track; and
wherein the first piston is not fixedly coupled to the second piston, such that the first piston is movable independently of the second piston.

2. The piston assembly according to claim 1, wherein the track rotates about the axis of rotation of the track while each cylinder remains stationary with respect to the axis of rotation of the track.

3. The piston assembly according to claim 1, wherein the track is a radial track.

4. The piston assembly according to claim 1, wherein the piston head moves in reciprocating non-simple harmonic motion within the cylinder along the piston axis in accordance with the path of the cam surface.

5. The piston assembly according to claim 1, wherein each stabilizing element is rigidly attached to each piston head by one or more fasteners.

6. The piston assembly according to claim 1, wherein the shape of the contact surface of each stabilizing element corresponds to the shape of the edge surface of the track.

7. The piston assembly according to claim 1, wherein each stabilizing element is straight when viewed from a direction parallel to the axis of the piston.

8. The piston assembly according to claim 1, wherein the edge surface is lubricated such that the contact surface of the stabilizing element contacts the edge surface of the track via a layer of lubricant.

9. A piston assembly comprising:
a track; and
a piston movable within a cylinder, the piston having a piston head and a piston axis;
wherein the track is rotatable relative to the cylinder about an axis of rotation extending perpendicular to the piston axis and the track has a cam surface and an edge surface extending away from the cam surface;
wherein the piston is coupled to the track by a follower running on the cam surface;
wherein the cam surface is shaped such that, as the track moves relative to the cylinder, the piston head moves in reciprocating motion within the cylinder along the piston axis in accordance with a path of the cam surface;
wherein the track comprises a first cam surface and a second cam surface opposing each other and a radial distance between the first cam surface and second cam surface that varies along an extent of the track; and
wherein the piston comprises a first follower and a second follower respectively running on the first cam surface and second cam surface.

10. The piston assembly according to claim 9, wherein a stabilizing element is connected to the piston, the stabilizing element extending below the piston head and including a contact surface engaging the edge surface of the track.

11. The piston assembly according to claim 10, wherein the stabilizing element is straight when viewed from a direction parallel to the axis of the piston.

12. The piston assembly according to claim 9, wherein the follower comprises a roller mounted to the piston, and wherein the roller is rotatable relative to the piston as the roller runs along the track.

13. The piston assembly according to claim 9, wherein the piston head moves in reciprocating non-simple harmonic motion within the cylinder along the piston axis in accordance with the path of the cam surface.

14. A piston assembly comprising:
a track; and
a piston moveable within a cylinder, the piston having a piston head and a piston axis, and the cylinder having a cylinder axis;
wherein the track is rotatable relative to the cylinder about an axis of rotation extending perpendicular to the piston axis and offset from the cylinder axis, and the track has a cam surface and an edge surface extending away from the cam surface;
wherein the piston is coupled to the track by a follower running on the cam surface;
wherein the cam surface is shaped such that, as the track moves relative to the cylinder, the piston head moves in reciprocating motion within the cylinder along the piston axis in accordance with a path of the cam surface; and
wherein the track comprises a first cam surface and a second cam surface facing away from each other in opposite directions;
wherein the piston comprises a first follower and a second follower respectively running on the first cam surface and second cam surface.

15. The piston assembly according to claim 14, wherein a stabilizing element is connected to the piston, the stabilizing element extending below the piston head and including a contact surface engaging the edge surface of the track.

16. The piston assembly according to claim 15, wherein the stabilizing element is straight when viewed from a direction parallel to the axis of the piston.

* * * * *